United States Patent
Phillips et al.

(10) Patent No.: US 10,511,597 B1
(45) Date of Patent: Dec. 17, 2019

(54) METHOD AND SYSTEM FOR MULTIFACTOR MUTUAL AUTHENTICATION

(71) Applicant: Capital One Services, LLC, McLean, VA (US)

(72) Inventors: Jeremy Phillips, Brooklyn, NY (US); Andrew Grossman, White Plains, NY (US); Rachel Collins, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/519,274

(22) Filed: Jul. 23, 2019

(51) Int. Cl.
*H04L 29/06* (2006.01)
*G06F 21/44* (2013.01)
(Continued)

(52) U.S. Cl.
CPC .......... *H04L 63/0869* (2013.01); *G06F 21/34* (2013.01); *G06F 21/36* (2013.01); *G06F 21/445* (2013.01); *G06K 7/1413* (2013.01); *G06K 7/1417* (2013.01); *G06K 9/4652* (2013.01); *G06K 9/6201* (2013.01); *G06K 19/06018* (2013.01); *G06K 19/06037* (2013.01); *G09G 5/02* (2013.01); *H04L 9/3234* (2013.01);
(Continued)

(58) Field of Classification Search
CPC ............. H04L 63/0853; H04L 63/0869; H04L 9/3234; H04L 9/3273; G06F 21/34; G06F 21/36; G06F 21/445
See application file for complete search history.

(56) References Cited

U.S. PATENT DOCUMENTS 9,485,102 B2   11/2016   Walker et al.
10,115,069 B2  10/2018   Ye et al.
(Continued)

FOREIGN PATENT DOCUMENTS

EP   3270340 A1      1/2018
KR   20020024224 A   3/2002
KR   20030062286 A   7/2003

OTHER PUBLICATIONS

Liu, Sha; Wang, Junyu; "A Security-Enhanced Express Delivery System Based on NFC", 13th IEEE Conference on Solid-State and Integrated Circuit Technology (ICSICT), IEEE, Oct. 25-28, 2016, 3 pages.*

(Continued)

*Primary Examiner* — Victor Lesniewski
(74) *Attorney, Agent, or Firm* — Banner & Witcoff, Ltd.

(57) ABSTRACT

Method and systems described herein may provide multifactor mutual authentication. A first server may provide a first party and a second party with at least two authentication components in order for the first party to authenticate the identity of the second party, and vice versa. The first authentication component may include a color-based authentication component, while the second authentication component may include a code-based authentication component. Both factors need to be validated in order for the authentication to be successful. The color-based authentication component, in combination with the code-based authentication component, may improve the speed with which the mutual authentication is performed.

20 Claims, 17 Drawing Sheets

(51) Int. Cl.
*G06K 7/14* (2006.01)
*G06K 19/06* (2006.01)
*G06K 9/62* (2006.01)
*G06K 9/46* (2006.01)
*G09G 5/02* (2006.01)
*G06F 21/34* (2013.01)
*G06F 21/36* (2013.01)
*H04L 9/32* (2006.01)
*G01S 19/13* (2010.01)

(52) U.S. Cl.
CPC ........ *H04L 9/3273* (2013.01); *H04L 63/0853* (2013.01); *G01S 19/13* (2013.01); *G09G 2354/00* (2013.01)

(56) References Cited

U.S. PATENT DOCUMENTS

| | | |
|---|---|---|
| 2004/0133446 A1 | 7/2004 | Myrick et al. |
| 2007/0078797 A1 | 4/2007 | Won et al. |
| 2012/0030133 A1 | 2/2012 | Rademaker |
| 2012/0066315 A1* | 3/2012 | Tuman .................... G06F 21/36 709/206 |
| 2012/0246077 A1* | 9/2012 | Skaaksrud ......... G06Q 30/0615 705/50 |
| 2014/0278635 A1* | 9/2014 | Fulton ............ G06Q 10/063112 705/7.14 |
| 2014/0279658 A1* | 9/2014 | Lievens ................. G06Q 10/02 705/336 |
| 2015/0081581 A1 | 3/2015 | Gishen |
| 2016/0247113 A1* | 8/2016 | Rademaker .... G06Q 10/063114 |
| 2017/0134372 A1* | 5/2017 | Dube .................. H04L 63/0823 |
| 2018/0159971 A1* | 6/2018 | Yang ......................... G06F 9/44 |
| 2018/0165638 A1* | 6/2018 | Wilkinson ............... G01S 5/02 |
| 2018/0341764 A1* | 11/2018 | Chou ..................... G06F 21/36 |
| 2019/0042720 A1* | 2/2019 | Delts .................. G06K 9/00154 |
| 2019/0095862 A1* | 3/2019 | Kilzer ............. G06Q 10/08355 |
| 2019/0114859 A1* | 4/2019 | Fee .................... G07C 9/00912 |
| 2019/0236667 A1* | 8/2019 | Phillips ................ B64C 39/024 |

OTHER PUBLICATIONS

Thomas, Jisha; Goudar, R.H.; "Multilevel Authentication using QR code based watermarking with mobile OTP and Hadamard transformation", International Conference on Advances in Computing, Communications and Informatics (ICACCI), IEEE, Sep. 19-22, 2018, pp. 2421-2425.*

* cited by examiner

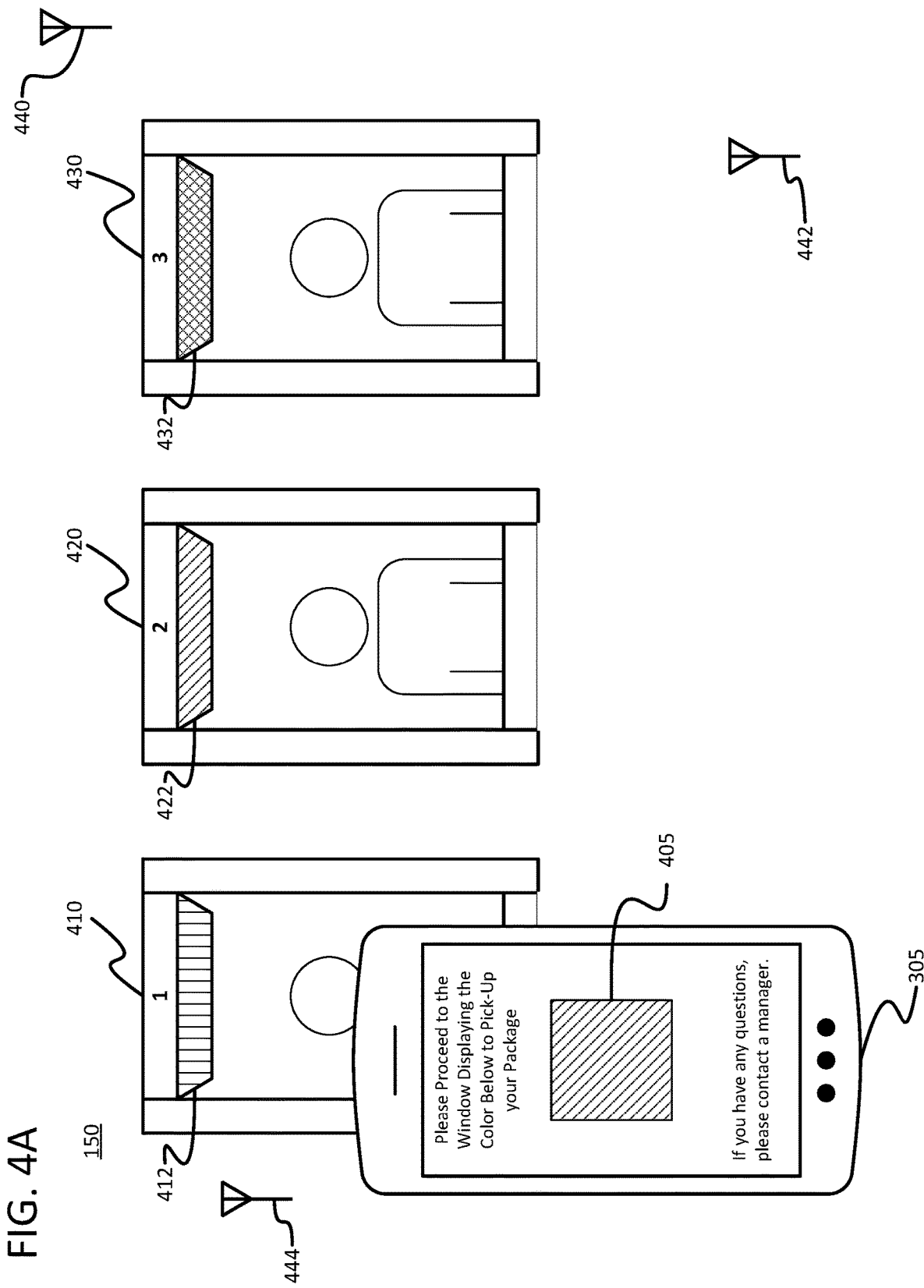

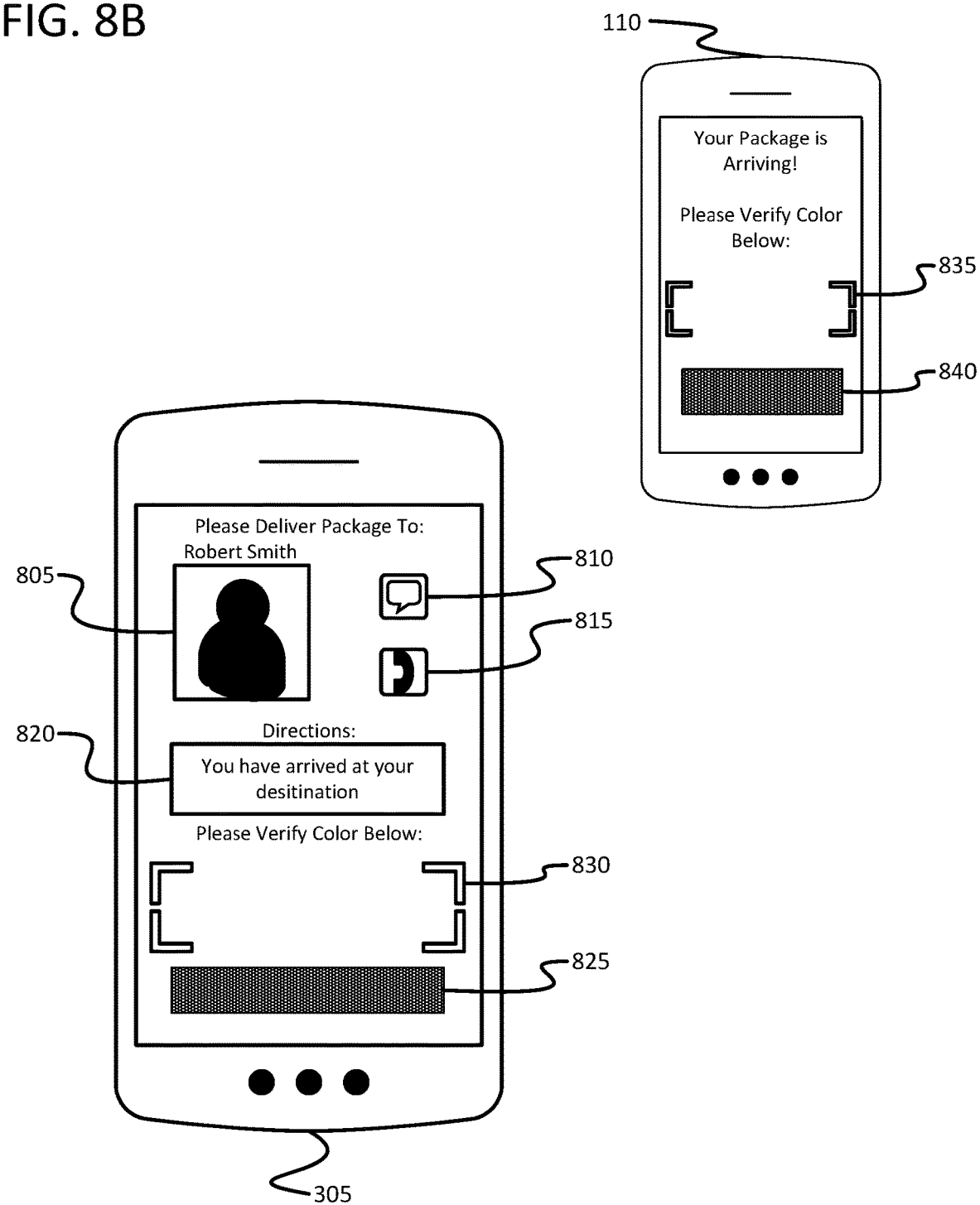

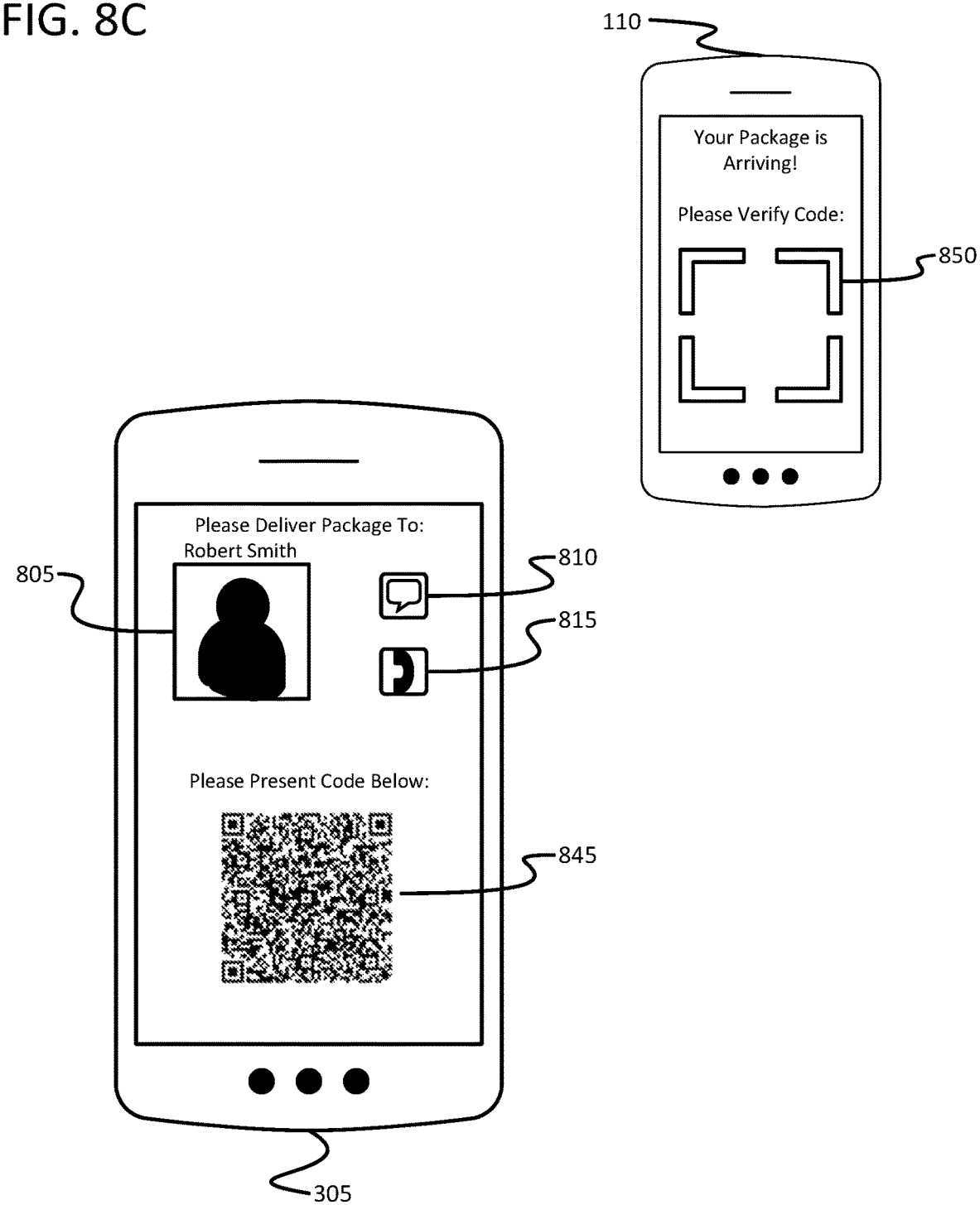

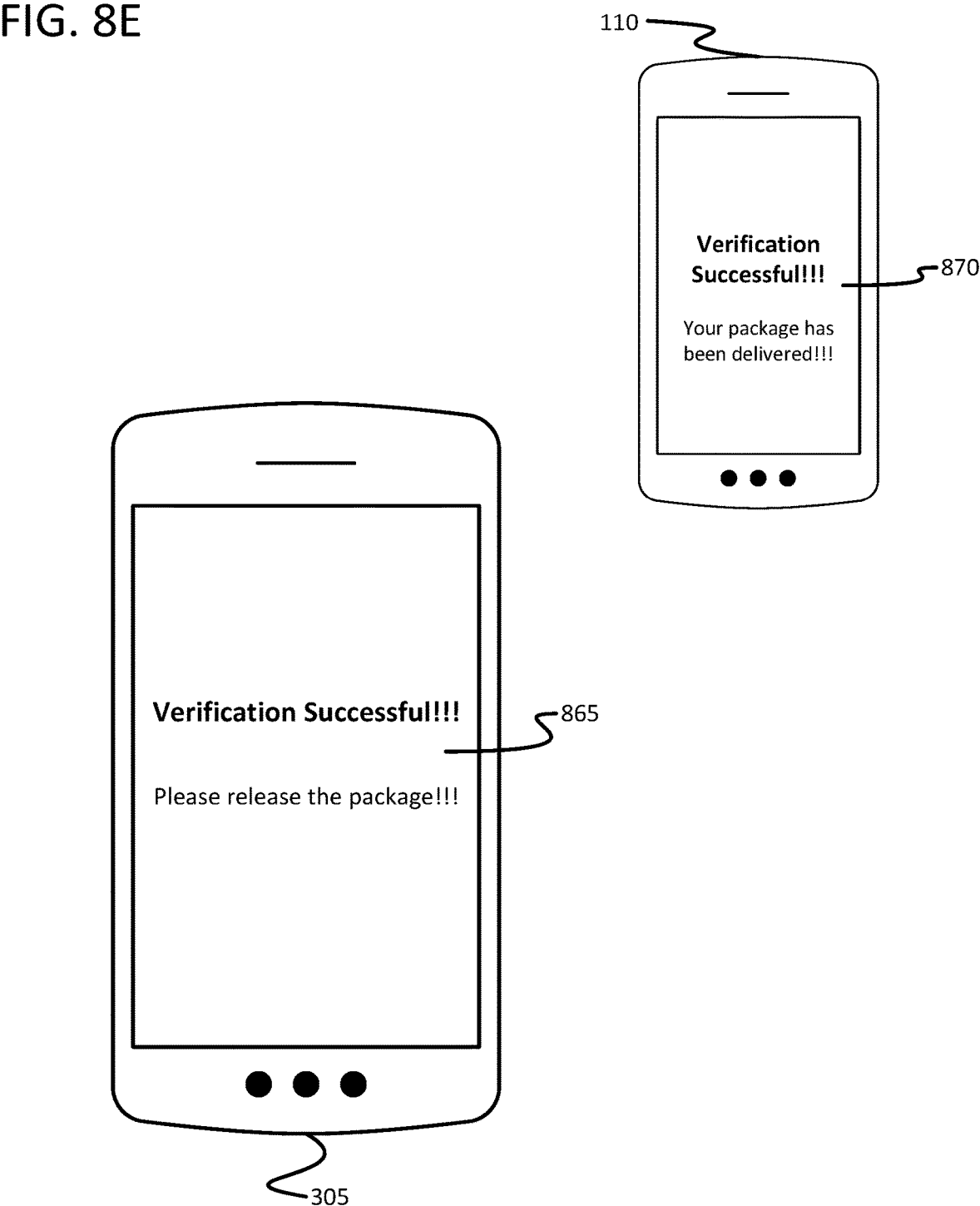

METHOD AND SYSTEM FOR MULTIFACTOR MUTUAL AUTHENTICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to authentication and more specifically to multifactor mutual authentication.

BACKGROUND

Multifactor authentication systems may provide authentication based on multiple pieces of evidence. While it has proven a useful tool, multifactor authentication also suffers from a number of shortfalls. For example, passwords or PIN numbers may be compromised; tokens may expire; and biometrics may be fooled or duplicated. Moreover, inputting the evidence may be time-consuming and could result in user fatigue. Accordingly, traditional multifactor authentication systems have a variety of flaws.

Aspects described herein may address these and other problems, and generally improve the quality, efficiency, and speed of multifactor mutual authentication.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems described herein may perform multifactor mutual authentication. The multifactor authentication described herein may include a color-based authentication component and a code-based authentication component. A first server may provide a first party and a second party with the two authentication components in order to perform mutual authentication. Combining the color-based authentication component and the code-based authentication component may improve security by creating irrefutable components shared by two parties. Additionally, the color-based authentication component may improve over traditional multifactor authentication systems by reducing the time spent performing the mutual authentication process, which could help mitigate user fatigue. Further, the color-based authentication component may improve the authentication process by generating colors of various hues that may only be detected by another computing device. Accordingly, the color-based authentication component may provide better security by providing a broader and more nuanced array of colors used for authentication purposes than traditional multifactor authentication systems. Moreover, the color-based authentication component may be related to a location of the first party. In this regard, the color-based authentication component may be linked to a navigation system. The color-based authentication component may change as the first party approaches the second party. For example, a color temperature of the color-based authentication component may change to a warmer variant as the first party nears the second party. In other examples, an intensity of the color-based authentication component may change as the first party nears the second party.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIGS. 4A-4D illustrate an example of the mutual authentication performed between the processing facility and the courier according to one or more aspects of the disclosure;

FIGS. 8A-8E shows an example of multifactor mutual authentication according to one or more aspects of the disclosure;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for multifactor mutual authentication. The multifactor authentication described herein may include a color-based authentication component and a code-based authentication component. A first server may provide a first party and a second party with the two authentication components in order to perform mutual authentication. When both factors are verified, the mutual authentication may be deemed successful and the identities of the first party and the second party may be validated.

Combining a color-based authentication component and a code-based authentication component may improve security by creating irrefutable components shared by two parties. Furthermore, the color-based authentication component improves over typical multifactor authentication systems by reducing the time spent performing the mutual authentication process. In this regard, typical multifactor authentication systems may rely on passwords, pin codes, or one-time codes, which take time to manually enter. The color-based authentication component, in combination with the code-based authentication component, provides two computer-readable elements to improve the speed with which the mutual authentication process is performed. This may help mitigate user fatigue. Further, the color-based authentication component may improve the security of the authentication process by generating colors of various hues that may only be detected by another computing device. In other words, a computing device may be able to discern the differences between the color-based authentication components that would not be recognized by the human eye. Accordingly, the color-based authentication component may provide better security by providing a broader and more nuanced array of colors used for authentication purposes than traditional multifactor authentication systems.

Figure 1:
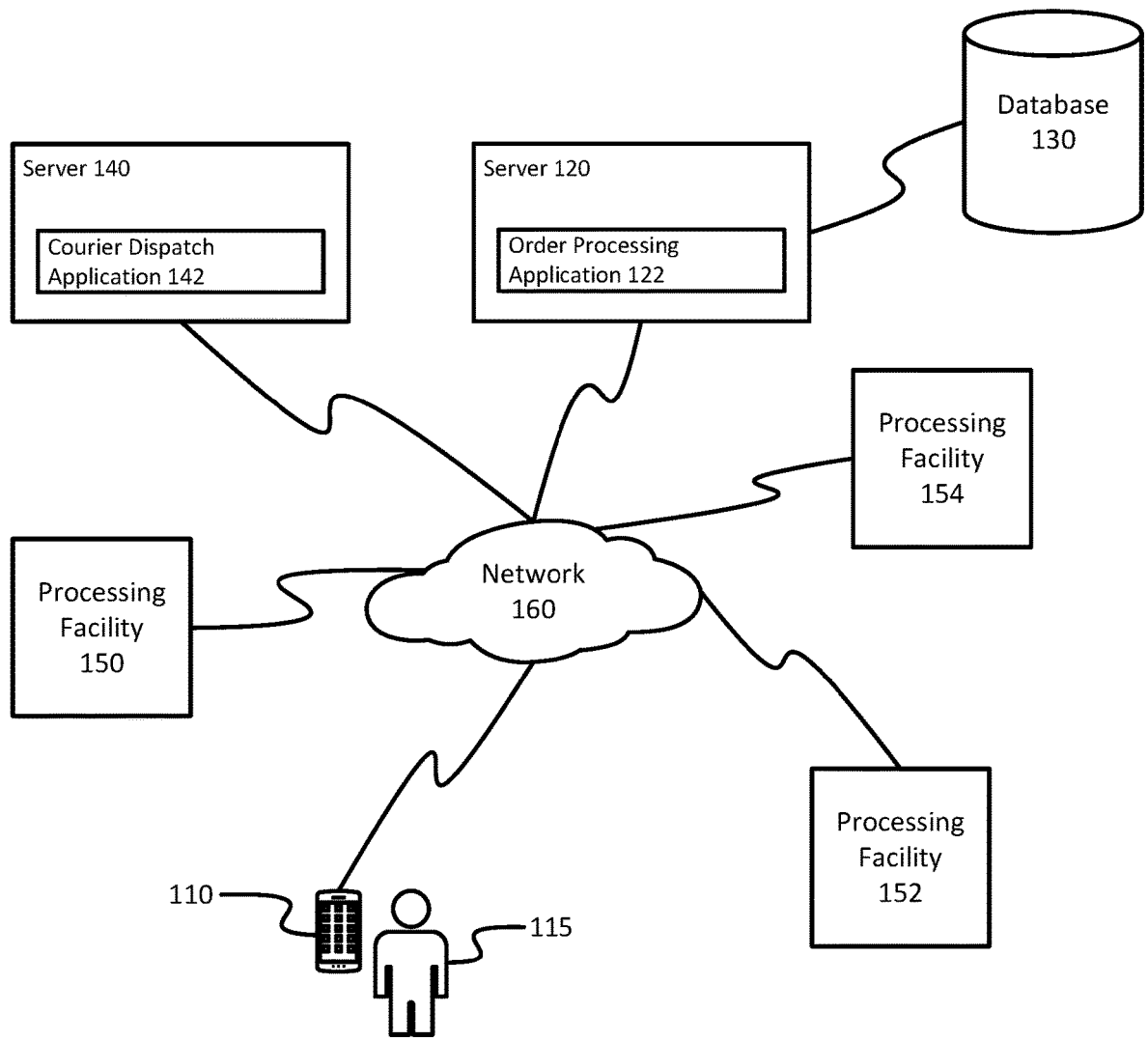
FIG. 1 shows an example of a control processing system in which one or more aspects described herein may be implemented.

Turning to FIG. 1, a system 100 is shown that includes a first user device 110, a first server 120 connected to a first database 130, a second server 140, and a plurality of processing facilities (i.e., 150, 152, and 154) interconnected via network 160.

First user device 110 may be a mobile device, such as a cellular phone, a mobile phone, a smart phone, a tablet, a laptop, or a computing device, like a desktop computer, laptop computer, or, alternatively, a virtual computer. First user device 110 may be configured to provide first user 115 with access to various applications and services. For example, first user device 110 may provide first user 115 with access to the Internet. Additionally, first user device 110 may provide first user 115 with one or more applications located thereon. The one or more applications may provide the first user with a plurality of tools and access to a variety of services. In some embodiments, the one or more applications may include a banking application that provides access to the first user's banking information, as well as perform routine banking functions, such as checking the first user's balance, paying bills, transferring money between accounts, and withdrawing money from an automated teller machine (ATM). The banking application may also allow first user 115 to order products, such as a new payment card or a second form of authentication, such as a token that generates a one-time code. In other embodiments, the one or more applications may include an online retailer, such as Amazon®, that allow first user 115 to purchase goods via the application.

First server 120 may be any server capable of executing an order processing application 122. Additionally, first server 120 may be communicatively coupled to first database 130. In this regard, first server 120 may be a stand-alone server, a corporate server, or a server located in a server farm or cloud-computer environment. According to some examples, first server 120 may be a virtual server hosted on hardware capable of supporting a plurality of virtual servers. In some embodiments, first server 120 may be a centrally-located server, such as a central banking hub, that communicates and coordinates with a plurality of branch locations.

Order processing application 122 may be server-based software configured to process orders placed by first user 115. Order processing application 122 may be the server-based software that corresponds to the client-based software executing on first user device 110. Additionally, or alternatively, order processing application 122 may coordinate the delivery of products ordered by first user 115. Coordinating the delivery may include the arrangement of pickup of the product by a courier from a processing facility and the delivery of the product by the courier to first user 115. According to some embodiments, order processing application 122 may provide authentication information to both the courier and processing facility to mutually authenticate each other. Similarly, order processing application 122 may also provide authentication information to both the courier and first user 115 that would allow the courier and first user 115 to authenticate each other's identity. The mutual authentication discussed herein may be performed to create an audit trail or chain of custody. In some embodiments, order processing application 122 may determine which processing facility should handle first user's 115 order. This determination may be made based on the capabilities of the processing facilities. Additionally, or alternatively, the processing facility may be selected based on geographic proximity to first user 115 and/or the courier.

First database 130 may be configured to store information on behalf of order processing application 132. The information stored by first database 130 may include, but is not limited to, user information, product information, order history, inventory, authentication information, and any additional information to facilitate delivery of products ordered by first user 115. First database 130 may include, but is not limited to relational databases, hierarchical databases, distributed databases, in-memory databases, flat file databases, XML databases, NoSQL databases, graph databases, and/or a combination thereof.

Second server 140 may be similar to first server 120. In this regard, second server 140 may be a stand-alone server, a corporate server, a server located in a server farm or cloud-computer environment, or a virtual server hosted on hardware capable of supporting a plurality of virtual servers. Second server 140 may be configured to execute courier dispatch application 142.

Courier dispatch application 142 may be server-based software configured to arrange the pick-up and delivery of products ordered by first user 115. Courier dispatch application 142 may be configured to receive authentication information from order processing application 122 and transmit the authentication information to a user device of a courier. Additionally, courier dispatch application 142 may receive confirmation of the pickup of the product from a processing facility. In some embodiments, courier dispatch application 142 may transmit the confirmation pickup to order processing application 122. Similarly, courier dispatch application 142 may receive confirmation of the delivery of the product to first user 115, and, in these embodiments, courier dispatch application 142 may notify order processing application 122 that the product has been delivered to first user 115.

System 100 may also include a plurality of processing facilities. As shown, system 100 includes a first processing facility 150, a second processing facility 152, and a third processing facility 154. While only three processing facilities are shown in system 100, it will be appreciated that more, or fewer, processing facilities may be deployed in system 100. Processing facilities may be configured to prepare the product and/or authenticate the courier. As noted above, the product may be a payment card. In these examples, first server 120 may be a central banking server and the processing facilities may be branch locations that generate a new payment card for first user, with a new account number, on behalf of the user. In other embodiments, the processing facility may be a warehouse, a restaurant (i.e. for food delivery), or a law office for process of service. Additionally, or alternatively, processing facilities may include one or more computing devices to direct the courier to the appropriate pick-up location and verify the identity of the courier before releasing the product to the courier for delivery.

First network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
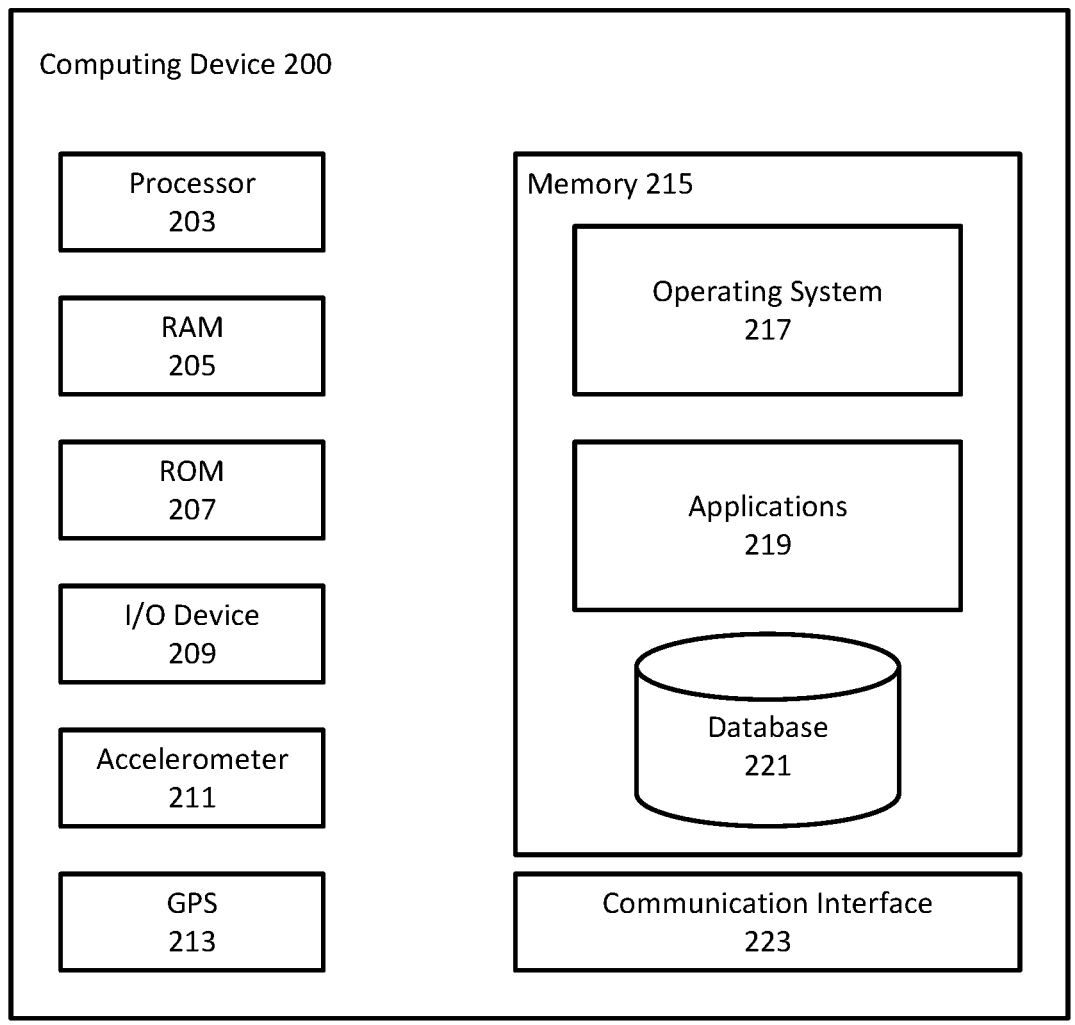
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. In some embodiments, I/O device 209 may include an image capture device.

Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user. In the context of a banking application, GPS receiver/antenna 213 may be used to locate one or more banking locations.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
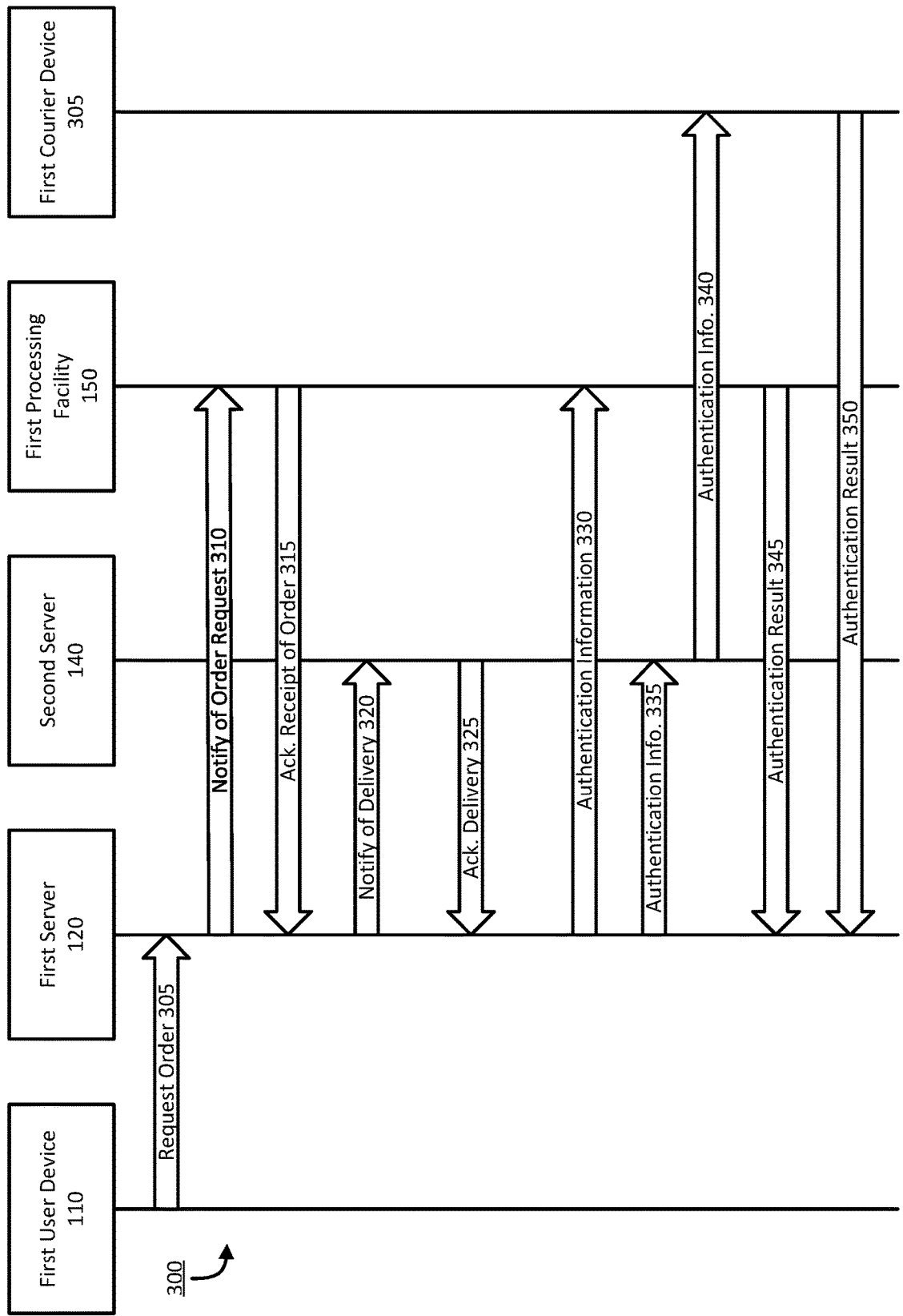
FIG. 3 shows a flowchart for providing mutual authentication information to a processing facility and a courier according to one or more aspects of the disclosure.

In response to receiving an order, a central-hub may coordinate with a processing facility to prepare a package for delivery and a courier service to arrange pick-up from the processing facility and delivery to the recipient. Part of this coordination may include providing authentication information to both the processing facility and the courier. The authentication information may be used to verify the identity of the courier when he/she arrives at the processing facility to pick-up the package. FIG. 3 shows a flowchart for providing mutual authentication information to a processing facility and a courier according to one or more aspects of the disclosure. Some or all of the steps of process 300 may be performed using one or more computing devices as described herein.

Process 300 begins at step 305, with first user device 110 placing an order with first server 120. The order may be made through an application located on first user device 110. Alternatively, the order may be made through a website accessed by first user 115 via first user device 110. The order may include information about the recipient, including the recipient's name, mobile phone number, email address, photograph, delivery location, address, billing information, or any combination thereof. The order may be transmitted from first user device 110 to first server 120 via a communication channel. In some embodiments, the communication channel may be secured using an encryption protocol, such as SSL or TLS. Additionally, or alternatively, the order itself may be encrypted. In this regard, the order may be encrypted with a public key of first server 120. Alternatively, the order may be encrypted with a symmetric key shared by first user device 110 and first server 120.

First server 120 may receive the order from first user device 110. As discussed above, first server 120 may decrypt the order before processing it. Processing the order may include analyzing the order to determine the type and nature of the request, reviewing inventory of processing facilities to determine processing facilities that can fulfill the order, determining processing facilities that have the capability to fulfill the order, determining a processing facility that is located proximate to first user device 110 and first courier device 305, or any combination of the foregoing. Once first server 120 determines a processing facility to fulfill the order, first server 120 may transmit a notification of the order to first processing facility 150 in step 310. Similar to the order transmission between first user device 110 and first server 120, the transmission between first server 120 and first processing facility 150 may be transmitted over a secure channel or, otherwise, encrypted.

In step 315, first processing facility 150 may acknowledge receipt of the order. In instances where first processing facility 150 does not acknowledge the notification of the order or takes too long to respond, first server 120 may transmit a notification of order to second processing facility 152. Step 310 may be repeated until first server 120 finds a processing facility to handle the order. Alternatively, the notification of the order transmitted in step 310 may be transmitted to a plurality of processing facilities, and the first processing facility to respond with the acknowledgment in step 315 may process the order.

In step 320, first server 120 may notify second server 140 of a pending delivery. Step 320 may occur concurrently with step 310. Alternatively, the notification transmitted in step 320 may occur after receiving the acknowledgement from first processing facility 150. In these embodiments, the notification transmitted in step 320 may include information about the delivery, including the name and location of first processing facility, the type and nature of the order, the delivery address, or any combination thereof.

In step 325, second server 140 may acknowledge receipt of the order. In some embodiments, the acknowledgment may include information about the courier that will be handling the delivery. The information may include the courier's name, mobile phone number, email address, photograph, or any combination thereof. When second server 140 does not acknowledge the notification of the order or takes too long to respond, first server 120 may transmit the notification of delivery to a third server (not shown). Step 320 may be repeated until first server 120 finds a courier service that agrees to deliver the order. Alternatively, the delivery notification performed in step 320 may be transmitted to a plurality of servers that provide delivery services. In this embodiment, the first server to respond to the delivery notification may handle the delivery.

After arranging the processing facility and courier service, first server 120 may generate authentication information for the processing facility and courier to perform mutual authentication. The authentication information may comprise multiple factors, including a color-based authentication component and a code-based authentication component. The color-based authentication component may be a color or image assigned to both the courier and the processing facility. In some embodiments, the color or image may only be used once, having the effect of a one-time code. The color-based authentication component may provide security by generating colors of various hues that may only be detected by another computing device. That is, a computing device may be able to discern the differences between the color-based authentication components that may not be recognized by the human eye. Accordingly, the color-based authentication component may provide better security than traditional authentication mechanisms. Additionally, or alternatively, the color-based authentication component may be used as a guidepost, or signpost, to direct the courier to the proper pick-up location. As will be discussed in greater detail below, the processing facility may display the color-based authentication component via a notification mechanism as a means to direct the courier to the pick-up location.

When a first-color based authentication component of the courier matches a second-color based authentication component of the processing facility, a first factor in the multi-factor authentication process may be completed. Accordingly, the mutual authentication process may proceed to the code-based authentication component part of the multifactor authentication process. In this regard, the code-based authentication component may be a QR-code, bar code, or some other machine-readable code. In some embodiments, the code-based authentication may be generated using one or more factors, such as the recipient's name, mobile phone number, email address, delivery location, address, billing information, the product or good that is being delivered, the courier's name, mobile phone number, email address, or any combination thereof. In other embodiments, the code-based authentication component may be based on a subset of the above-identified factors. In further embodiments, the subset of factors used to generate the code-based authentication component may be rotated periodically.

In step 330, first server 120 may transmit the generated authentication information to first processing facility 150. Similarly, in step 335, the generated authentication information may be transmitted to second server 140. Second server 140 may then forward the authentication information to first courier device 305 in step 340. It will be appreciated that first server 120 may transmit the authentication information to first courier device directly. Additionally, steps 330, 335, and 340 may occur concurrently.

In step 345, first processing facility 150 may transmit the authentication result to first server 120. Similarly, in step 350, first courier device 305 may transmit the authentication result to first server 120. In some embodiments, first courier device 305 may transmit the authentication result to second server 140, which may then forward the authentication result to first server 120. The authentication result may indicate that the multifactor authentication was successful. That is, the color-based component and the code-based component of first processing facility 150 and first courier device 305 matched. Accordingly, first processing facility 150 may release the package to the courier for delivery to the recipient. Additionally, first server 150 may notify first computing device that the order is enroute. As will be discussed in greater detail below with respect to FIG. 7, first server 120 may also generate updated authentication information for the courier device and the first user device to mutually authenticate each other.

In some instances, authentication results 345 and 350 may indicate that the authentication failed. In these embodiments, first server 120 may coordinate with processing facility 150 and first courier device 305 to determine why authentication failed. For example, first server 120 may update the authentication information. Alternatively, first server 120 may contact a courier to arrange for the correct pick-up at processing facility 150.

After receiving notification of the delivery, a courier may proceed to the processing facility to pick-up the package for delivery to the recipient. The notification may display the authentication information (i.e., the color-based authentication component) and provide directions to the processing facility. In some embodiments, the color-based authentication component may change from a first color to a second color as the courier approaches the processing facility. In other embodiments, the color-based authentication component may change a color or a color temperature of the color-based authentication component to a warmer variant as the courier approaches the processing facility. Additionally, or alternatively, the color-based authentication component may change a color or a color temperature of the color-based authentication component to a warmer variant as time elapses. Once the courier arrives at the pick-up location, processing facility may authenticate the courier using the multifactor mutual authentication techniques. FIGS. 4A-4D illustrate an example of the mutual authentication performed between the processing facility and the courier according to one or more aspects of the disclosure.

FIG. 4A shows an example of first processing facility 150. First processing facility may include a first pick-up location 410, a second pick-up location 420, a third pick-up location 430, a first antenna 440, a second antenna 442, and a third antenna 444.

First pick-up location 410 may include a pick-up window and a notification mechanism 412 to present a color-based authentication component. Notification mechanism 412 may be a light that is configurable to display a plurality of colors. Alternatively, notification mechanism 412 may be a display, such as a monitor, a television, a tablet, a computer, a mobile device, or any equivalent thereof, that may be configured to present the color-based authentication component. In addition to being used for authentication component, the color-based authentication component provided by the notification mechanism may serve as a guidepost, or signpost, to direct the courier to the appropriate pick-up location.

Second pick-up location 420 and third pick-up location 430 may be configured similarly to first pick-up location 410. In this regard, second pick-up location 420 and third pick-up location 430 may include second notification mechanism 422 and third notification mechanism 432, respectively. According to some embodiments, first pick-up location 410, second pick-up location 420, and third pick-up location 430 may be automated kiosks that include an interactive display, a notification mechanism, and a secure compartment for storing the package and releasing the package to the courier after mutual authentication has been performed successfully. It will be further appreciated that first processing facility may have more, or fewer, pick-up locations than first pick-up location 410, second pick-up location 420, third pick-up location 430 illustrated in FIG. 4A.

As noted above, first processing facility may include first antenna 440, second antenna 442, and a third antenna 444 (collectively "antennas"). These antennas may provide a wireless network to first processing facility 150. Additionally, or alternatively, the antennas may be used to provide indoor location services. Indoor location services may triangulate the location of first courier device 305 inside first processing facility 150 to provide navigation to the courier. In this regard, GPS, or other location services, may be limited indoors, and the antennas, and the indoor location services, may be used to provide navigation to direct the courier to the proper pick-up location. Additionally, the antennas may detect first courier device 305 when first courier device 305 enters first processing facility 150. In this regard, first courier device 305 may have previously registered on the wireless network provided by the antennas. Alternatively, first courier device 305 may connect to the wireless network provided by the antennas to access Wi-Fi, location services, or both. The antennas may transmit the first courier device's presence to a server located at first processing facility 150. In response to recognizing first courier device's presence at first processing facility 150, the server may prompt one of the notification mechanisms to display the color-based authentication component.

When first courier device 305 arrives at first processing facility 150, first courier device 305 may display prompt 405. Prompt 405 may direct the courier to proceed to the pick-up location that matches the color or image displayed in the prompt. In this way, the color-based authentication component may provide a guidepost, or signpost, that directs the courier to the proper pick-up location, in addition to serving as the first part of a multifactor authentication process. As shown in FIG. 4A, the color-based authentication component presented in prompt 405 matches the color-based authentication component presented by second notification mechanism 422. Accordingly, the courier would proceed to second pick-up location 420.

Figure 4B:
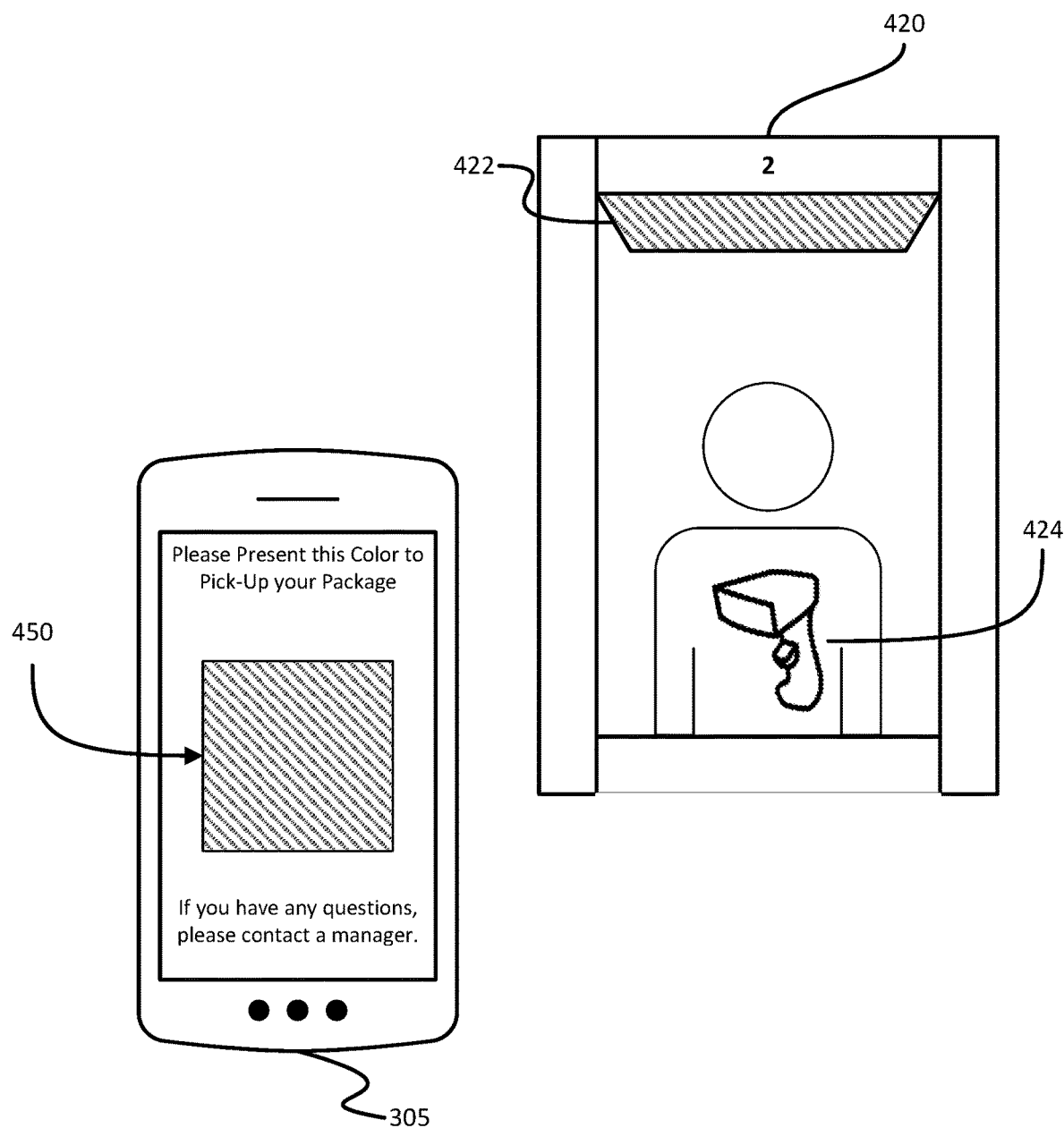

Turning to FIG. 4B, the first part of the multifactor authentication process is illustrated. In this regard, first courier device 305 may be prompted to present color 450 to second pick-up location 420. Second pick-up location 420 may have a scanner 424 to read color 450. In this regard, scanner 450 may be an image capture device, such as a camera, or a bar code reader. Alternatively, scanner 424 may be an image capture device or a bar code reader built in to an automated kiosk. Accordingly, scanner 424 may read color 450 on first courier device 305. When color 450 does not match the color presented by second notification mechanism 422, first courier device 305 may notify the courier that the authentication has failed. In some embodiments, first courier device 305 may present directions to the courier to the correct pick-up location. When color 450 matches the color presented by second notification mechanism 422, the multifactor authentication process may proceed to the second part of the authentication process. In some embodiments, first courier device 305 may be prompted to read the color presented by second notification mechanism 422 prior to advancing to the second part of the authentication process.

Figure 4C:
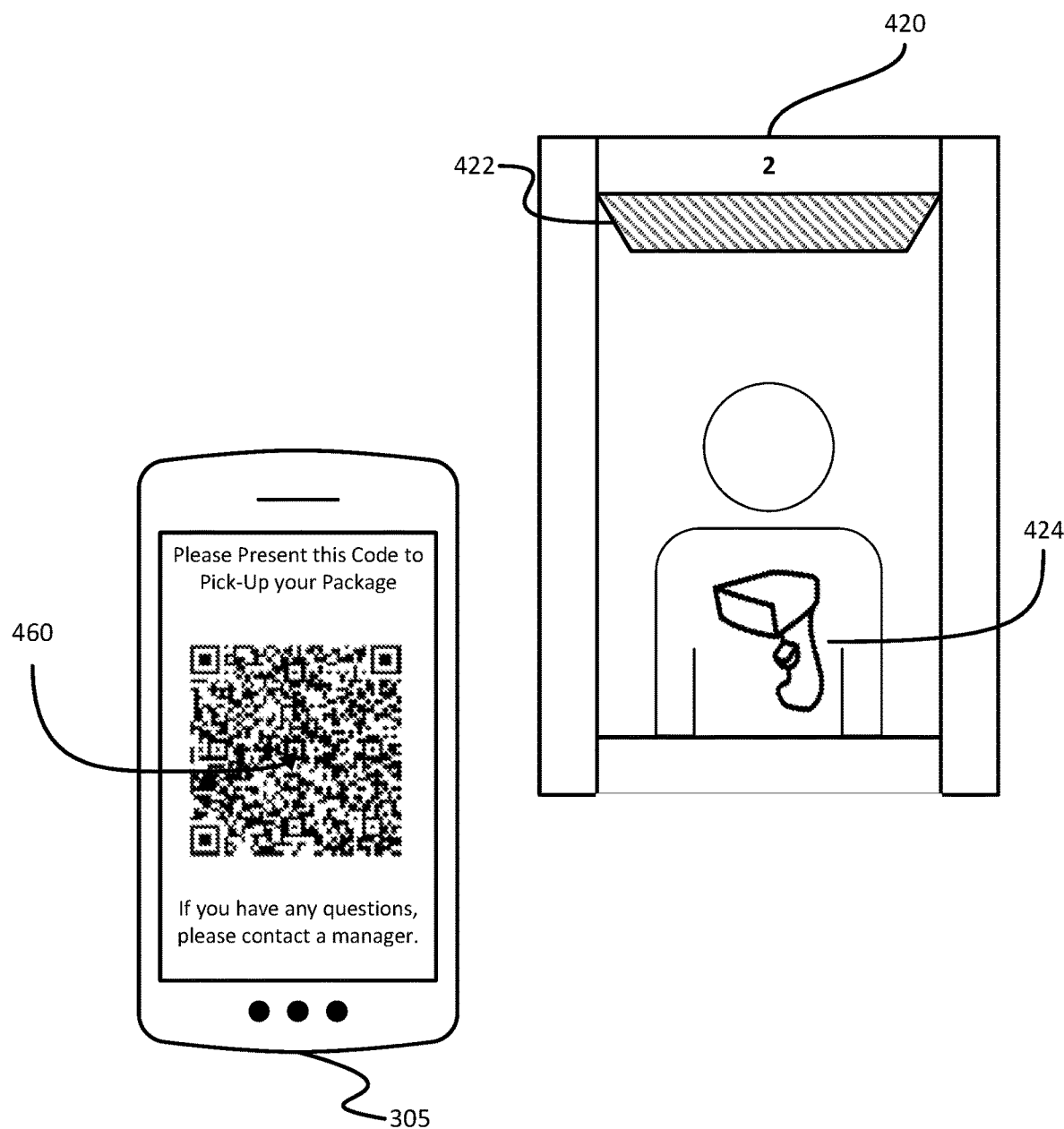

FIG. 4C illustrates an example of a first segment of the second part of the authentication process. In particular, FIG. 4C shows first processing facility 150 authenticating first courier device 305. As noted above, when color 450 matches the color presented by second notification mechanism 422, the display of first courier device 305 may convert from color 450 to code-based authentication component 460. As previously discussed, code-based authentication component 460 may be a QR-code or bar code generated from one or more pieces of information related to the order. Accordingly, first courier device 305 may present code-based authentication component 460 to be read by scanner 424. If code-based authentication component 460 does not match the code expected by first processing facility 150, the authentication may fail. Accordingly, the courier may be directed to the proper pick-up location and first processing facility 150 may be directed to not release the package to the courier. When code-based authentication component 460 matches the code of first processing facility 150, first courier device may verify first processing facility 150 and second pick-up location 420.

Figure 4D:
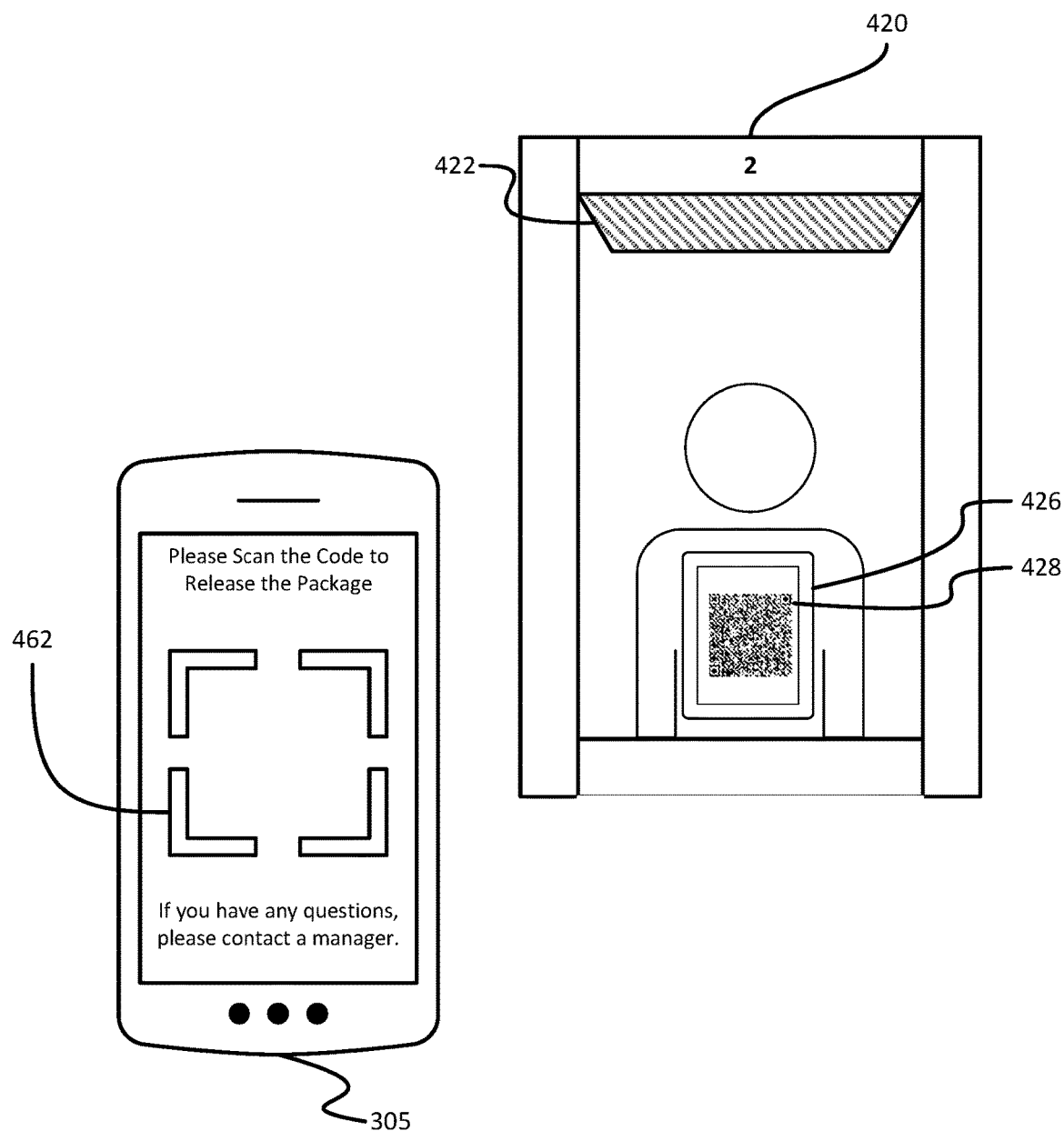

FIG. 4D illustrates an example the second segment of the second part of the authentication process. In particular, FIG. 4D shows first courier device 305 authenticating first processing facility 150 and second pick-up location 420. As discussed above, when code-based authentication component 460 matches the code of first processing facility 150, first processing facility 150, via second pick-up location 420, may present a second code-based authentication code 428 on a device 426. Device 426 may be a display, such as a monitor, a television, a tablet, a computer, a mobile device, or any equivalent thereof. In some embodiments, device 426 may be the same as second notification mechanism 422. The code-based authentication component 460 on first courier device 305 may convert to image capture screen 462. In this regard, an image capture device located on first courier device 305 may be activated to capture second code-based authentication code 428. If second code-based authentication component 428 does not match the code expected by first courier device 305, the authentication may fail. First courier device 305 may be redirected to another pick-up location and first processing facility 150 may not release the package to the courier. However, when second code-based authentication component 428 matches the code expected by first courier device, both parties have successfully verified each other's identity and first processing facility 150 may release the package to the courier.

Combining the color-based authentication component and the code-based authentication component may improve security by creating irrefutable components shared by two parties. Furthermore, the color-based authentication component improves over typical multifactor authentication systems by reducing the time spent performing the mutual authentication process. In this regard, typical multifactor authentication systems may rely on passwords, pin codes, or one-time codes, which take time to manually enter. The color-based authentication component, in combination with the code-based authentication component, provides two computer-readable elements to improve the speed with which the mutual authentication process is performed. Further, the color-based authentication component may provide an additional layer of security by generating colors of various hues that may only be detected by another computing device. That is, a computing device may be able to discern the differences between the color-based authentication components that may not be recognized by the human eye. Accordingly, the color-based authentication component may provide better security than traditional multifactor authentication systems.

Furthermore, while the above examples and embodiments have been described with respect to a courier picking up a package from a processing facility to deliver to a recipient, it will be appreciated that the methods and systems described above may apply to a recipient who picks up a package directly from a processing facility. In this regard, the authentication information may be transmitted to first processing facility 150 and first computing device 110. When first user 115 arrives at first processing facility 150, first user 115 may perform the authentication techniques above to pick-up their package. Performing mutual authentication during a package exchange creates an audit trail or chain of custody, ensures that an unauthorized user does not gain access to the package, and allows a recipient to track a package. Furthermore, the color-based authentication component provides an additional benefit of providing signposts to direct a user (i.e., the courier or first user 115) to the proper pick-up location, thereby improving the package pick-up process.

Figure 5:
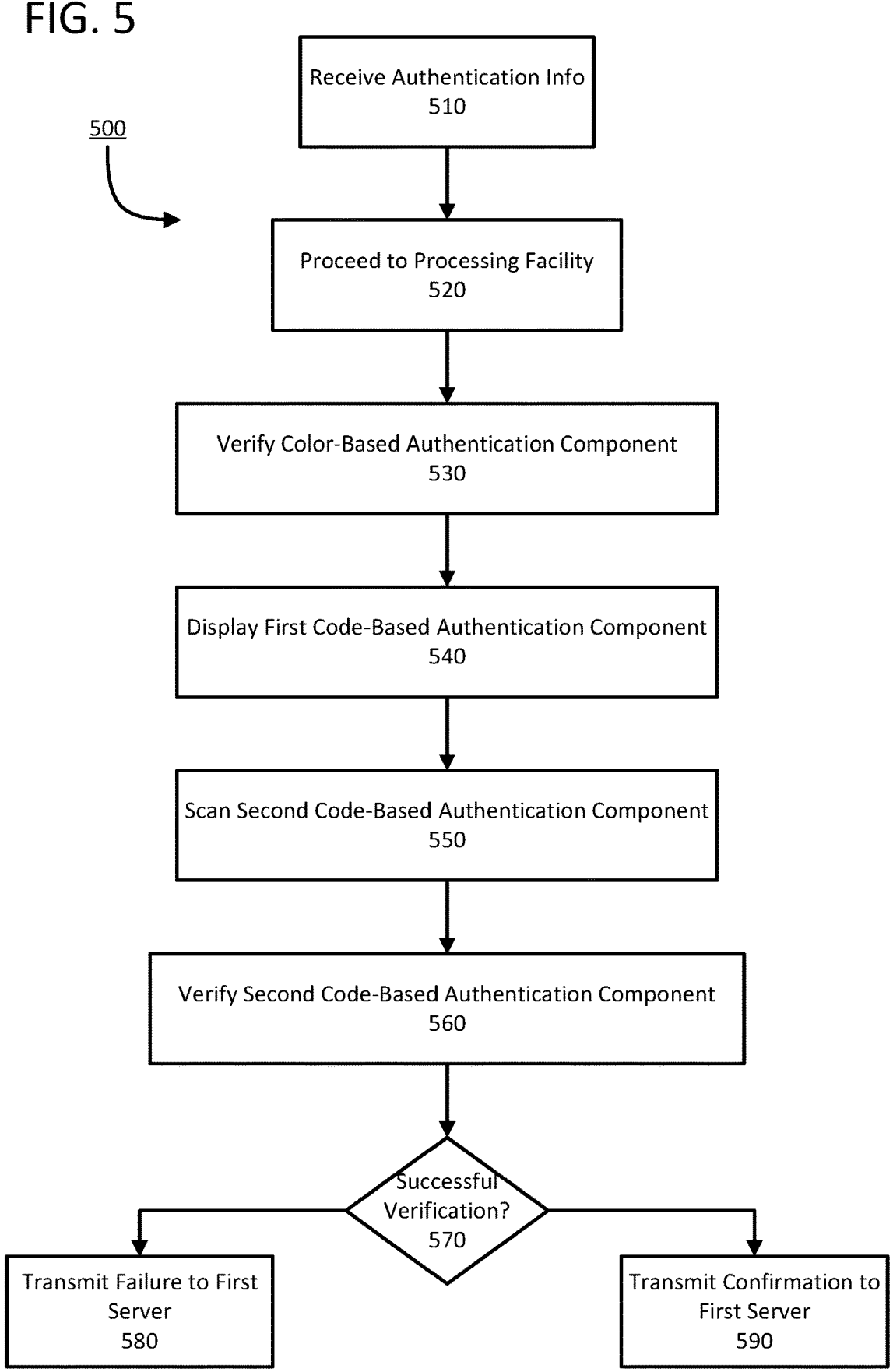
FIG. 5 shows a flow chart of a process for the mutual authentication performed by a courier device according to one or more aspects of the disclosure.

Turning to FIG. 5, a flow chart of a process 500 for the mutual authentication performed by first courier device 305 is shown. Some or all of the steps of process 500 may be performed using one or more computing devices as described herein.

Process 500 begins in block 510, with first courier device 305 receiving authentication information from first server 120. As noted above, the authentication information may be received over a secure communication channel. Accordingly, first courier device 305 may decrypt the received authentication information. Once decrypted, first courier device 305 may obtain a pick-up location (i.e. processing facility), a color-based authentication component, and a code-based authentication component. The authentication information may also include additional information, such as the recipient's name, mobile phone number, email address, delivery location, address, billing information, the product or good that is being delivered, or any combination thereof.

In block 520, the courier may proceed to the processing facility. In some embodiments, first courier device 305 may include an application that manages the authentication components, provide communication capabilities (i.e., talk, text, etc.), and navigation functionality. Accordingly, the application may provide directions to the courier, via first courier device 305, from the courier's current location to the processing facility. As noted above, the application may display the color-based authentication component which may change color as the courier approaches the processing facility. After arriving at the processing facility, the courier may use the color-based authentication component as a guidepost to determine the proper pick-up location.

In block 530, first courier device 305 may verify color-based authentication component located at the pick-up location. This may activate a camera located on first courier device 305 to capture the color-based authentication component displayed at the pick-up location. Similarly, first courier device 305 may present the color-based authentication component to an image capture device located at the pick-up location. In this regard, first courier device 305 and the pick-up location may mutually authenticate each other using the color-based authentication component. When the color-based authentication component is successfully authenticated, the mutual authentication process may proceed to authenticate the second factor (i.e., the code-based authentication component).

In block 540, first courier device 305 may display a first code-based authentication component. As noted above, the first code-based authentication component may be a QR code or a bar code. The pick-up location may scan, or otherwise read, the first code-based authentication component. In response to the code-based authentication component being read, first courier device may receive a signal from first server 120 or, alternatively, the pick-up location that prompts first courier device 305 to scan a second code-based authentication component presented by the pick-up location in block 550. The signal to prompt first courier device 305 to scan the second code-based authentication component may be transmitted in response to successful verification of first code-based authentication component. Alternatively, the signal to prompt first courier device 305 to scan the second code-based authentication component may be transmitted in response to the pick-up location scanning the first code-based authentication component. As noted above, the color-based authentication component may improve the security of the authentication process by generating colors of various hues that may only be detected by another computing device. Accordingly, the color-based authentication component may provide better security by providing a broader and more nuanced array of colors to confirm the identity of a user.

In block 560, first courier device may verify the second code-based authentication component. In some embodiments, first courier device 305 may compare the second code-based authentication component to the first code-based authentication component to determine whether they contain identical information. Alternatively, first courier device may compare the second code-based authentication component to a code-based authentication component received from first server 120. In block 570, first courier device 305 may determine whether the multifactor authentication was successful. As discussed above, multifactor authentication may be successful when both the color-based authentication component and the code-based authentication component are verified. When the multifactor authentication is unsuccessful, first courier device 305 may transmit an authentication failure to first server 120 in block 580. However, when the multifactor authentication is successful, first courier device 305 may transmit a confirmation to first server 120 in block 590. The confirmation may include an indication that the mutual authentication was performed successfully. Additionally, the confirmation may include an indication that the courier is in possession of the package.

Figure 6:
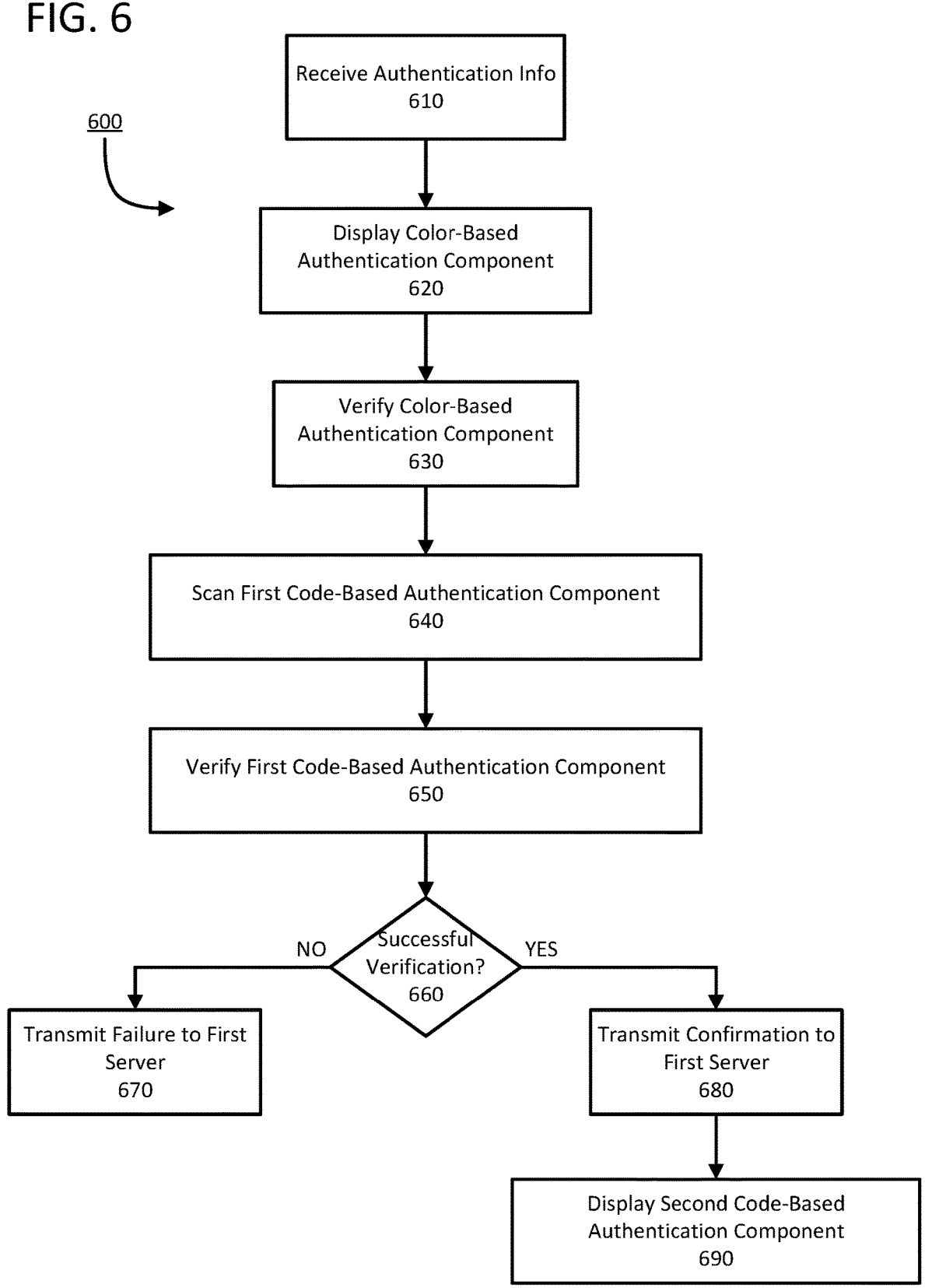
FIG. 6 shows a flow chart of a process for the mutual authentication performed by a pick-up location according to one or more aspects of the disclosure.

Turning to FIG. 6, a flow chart of a process 600 for the mutual authentication performed by the pick-up location is shown. Some or all of the steps of process 600 may be performed using one or more computing devices as described herein.

In block 610, the processing facility may receive authentication information for a first courier. As discussed above, the authentication information may be received from first server 120 via a secure communication channel. Accordingly, the processing facility may decrypt the received authentication information to obtain information about the courier, such as the courier's name, phone number, photograph, as well as the color-based authentication component and the code-based authentication component.

In block 620, the processing facility may display the color-based authentication component. As noted above, this may be performed via a display or monitor. Alternatively, the color-based authentication component may be displayed via a configurable light. In block 630, the processing facility may verify a color-based authentication component presented by first courier device 305. As noted above, if the color-based authentication component presented by first courier device 305 does not match the color-based authentication component of the processing facility, the mutual authentication process concludes. However, when the color-based authentication components match, process 600 proceeds to block 640 with the processing facility scanning a first code-based authentication component provided by first courier device 305. In block 650, the processing facility may verify the first code-based authentication component using the techniques described above with respect to block 560. In block 660, the processing facility may determine whether the multifactor authentication of first courier device 305 was successful. When the multifactor authentication is unsuccessful, the processing facility may transmit an authentication failure to first server 120 in block 670. However, when the multifactor authentication is successful, the processing facility may transmit a confirmation to first server 120 in block 680. In block 690, the processing facility may display a second-code based authentication component for first courier device 305 to scan and authenticate the processing facility.

Figure 7:
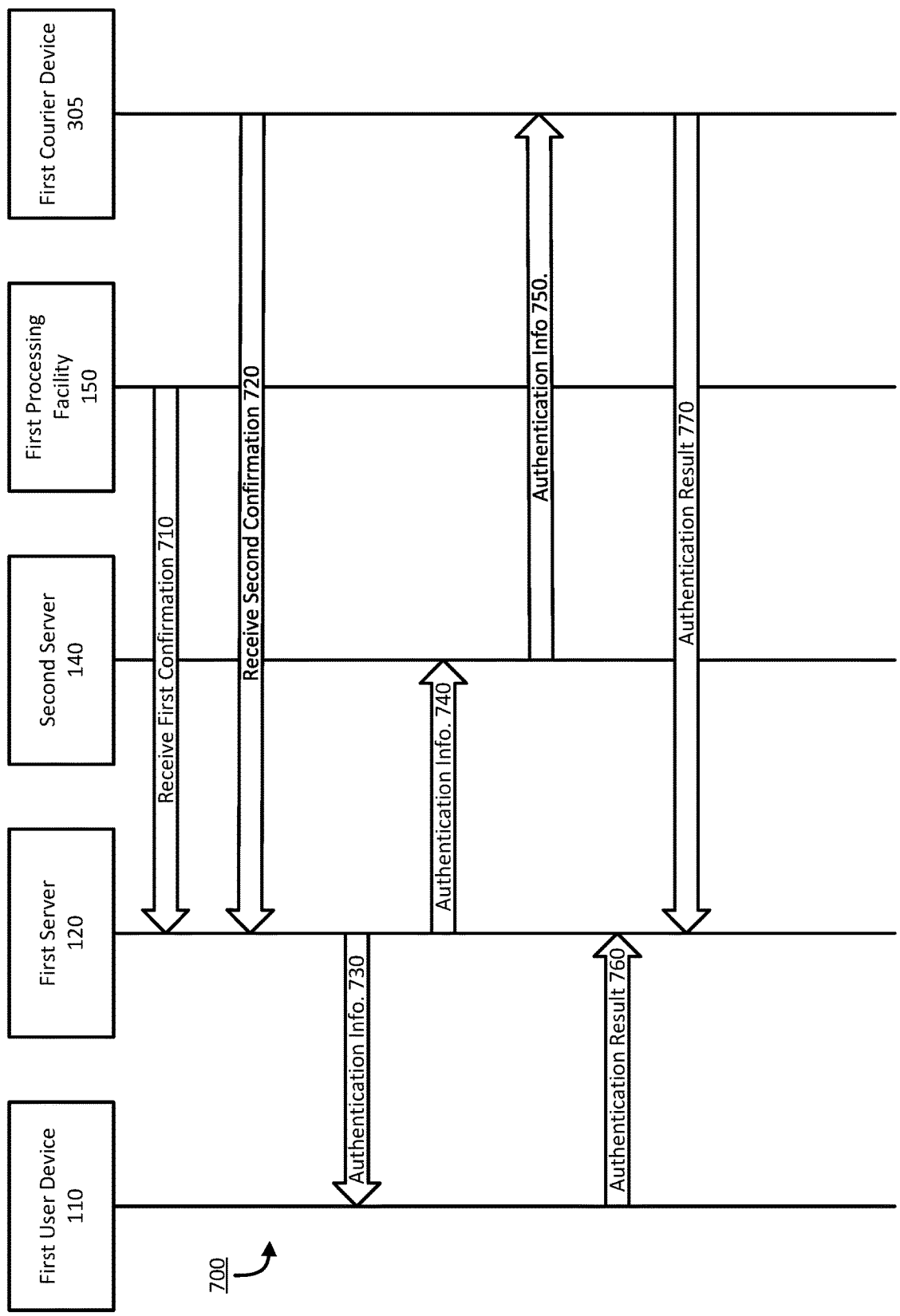
FIG. 7 shows a flow chart of a process for coordinating delivery of a package according to one or more aspects of the disclosure.

After the courier has acquired the package from the processing facility, first server 120 may coordinate the delivery of the package to the recipient. FIG. 7 shows a flow chart of a process for coordinating delivery of a package according to one or more aspects of the disclosure. Some or all of the steps of process 700 may be performed using one or more computing devices as described herein.

In step 710, first server 120 may receive a first confirmation from first processing facility 150. The first confirmation may indicate that the mutual authentication between first processing facility 150 and first courier device 305 was successful. Similarly, first server 120 may receive a second confirmation from first courier device in step 720. Like the first confirmation, the second confirmation may indicate that first courier device 305 and first processing facility 150 successfully completed the mutual authentication process.

In response to receiving both the first and second confirmations, first server 120 may generate authentication information for the courier and the recipient to perform mutual authentication. As discussed above with respect to FIG. 3, the authentication information may comprise multiple factors, including a color-based authentication component and a code-based authentication component. In step 730, first server 120 may transmit the generated authentication information to first user device 110. In step 740, first server 120 may transmit the generated authentication information to second server 140, which may then forward the authentication information to first courier device 305 in step 750. As discussed above, first server 120 may transmit the authentication information directly to first courier device 305 and bypass step 740. Additionally, steps 730, 740, and 750 may occur concurrently.

In step 760, first user device 110 may transmit the authentication result to first server 120. Similarly, in step 770, first courier device 305 may transmit the authentication result to first server 120. The authentication result may indicate that the multifactor authentication was successful. That is, the color-based component and the code-based component of first user device 110 and first courier device 305 matched. Accordingly, the package is delivered to the recipient. First server 150 may record the date and time that the package was delivered, as well as the results of the multifactor authentication.

After picking-up the package from the processing facility, the courier may be directed to the recipient to deliver the package. An application on first courier device 305 may display the recipient's name, a profile picture of the recipient, a messaging icon (e.g., to message the recipient), and a phone number associated with the recipient. In some embodiments, the application may present directions from the courier's current location to the recipient, as well as the color-based authentication component that may evolve as the courier draws close to the recipient. Once the courier arrives at the drop-off location, the recipient and the courier may mutually authenticate each other using the processing facility may authenticate the courier using the multifactor mutual authentication techniques. FIGS. 8A-8E illustrate an example of the mutual authentication performed between the courier and the recipient according to one or more aspects of the disclosure.

Figure 8A:
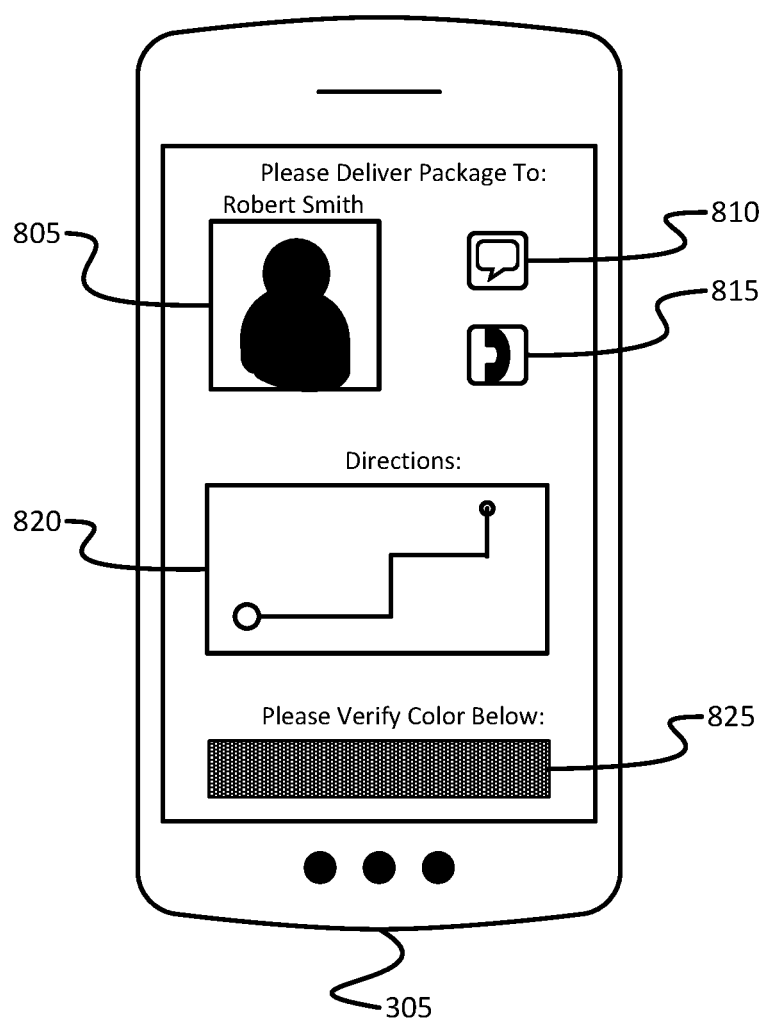

Turning to FIG. 8A, an example of first courier device 305 is shown after receiving the package at the processing facility. In this regard, first courier device may display profile picture 805 for the recipient, a messaging icon 810 to message the recipient, a phone icon 815 to call the recipient, directions 820 to the recipient, and color-based authentication component 825. Directions 820 may use a location module, such as GPS unit 213, to obtain directions to the recipient. First user device 110 may present a similar display to first courier device. In this regard, first user device 110 may display a profile photo of the courier, a messaging icon to message the courier, a phone icon to call the courier, a tracking feature to track the courier's progress, and a color-based authentication component. Once the courier arrives at the drop-off location, first courier device 305 and first user device 110 may perform mutual authentication to verify each other's identity.

FIG. 8B shows an example of first courier device 305 arriving at the drop-off location with first user device 110. First courier device 305 may update the display to reflect the current conditions. For example, directions 820 may indicate that the courier has arrived at the drop off location. Further, first courier device 305 may display first image capture section 830 to scan color-based authentication component 840 on first user device 110. First image capture section 830 may activate one or more image capture devices to scan color-based authentication component 840. Similarly, first user device 110 may display second image capture section 835 and color-based authentication component 840. In operation, first courier device 305 may scan color-based authentication component 840 and then first user device 110 may can color-based authentication component 825. It will be appreciated that the scanning order may be reversed. After each party scans the other's color-based authentication component, the devices may compare the scanned color-based authentication component to the stored color-based authentication component. When the color-based authentication components match, the authentication process proceeds to evaluate the second factor, the code-based authentication components.

FIG. 8C shows an example of first user device 110 verifying the identity of first courier device 305. In response to successful authentication of the first factor, the display of first courier device 305 may update to display first code-based authentication component 845. The display of first user device 110 may also update to include image capture section 850. Image capture section 850 may display the output of one or more image capture devices of first user device 110. In operation, first user device 110 may align first code-based authentication component 845 in image capture section 850 to validate first code-based authentication component 845. When validation is successful, the roles may be reversed for first courier device 305 to validate a second code-based authentication component presented by first user device 110.

Figure 8D:
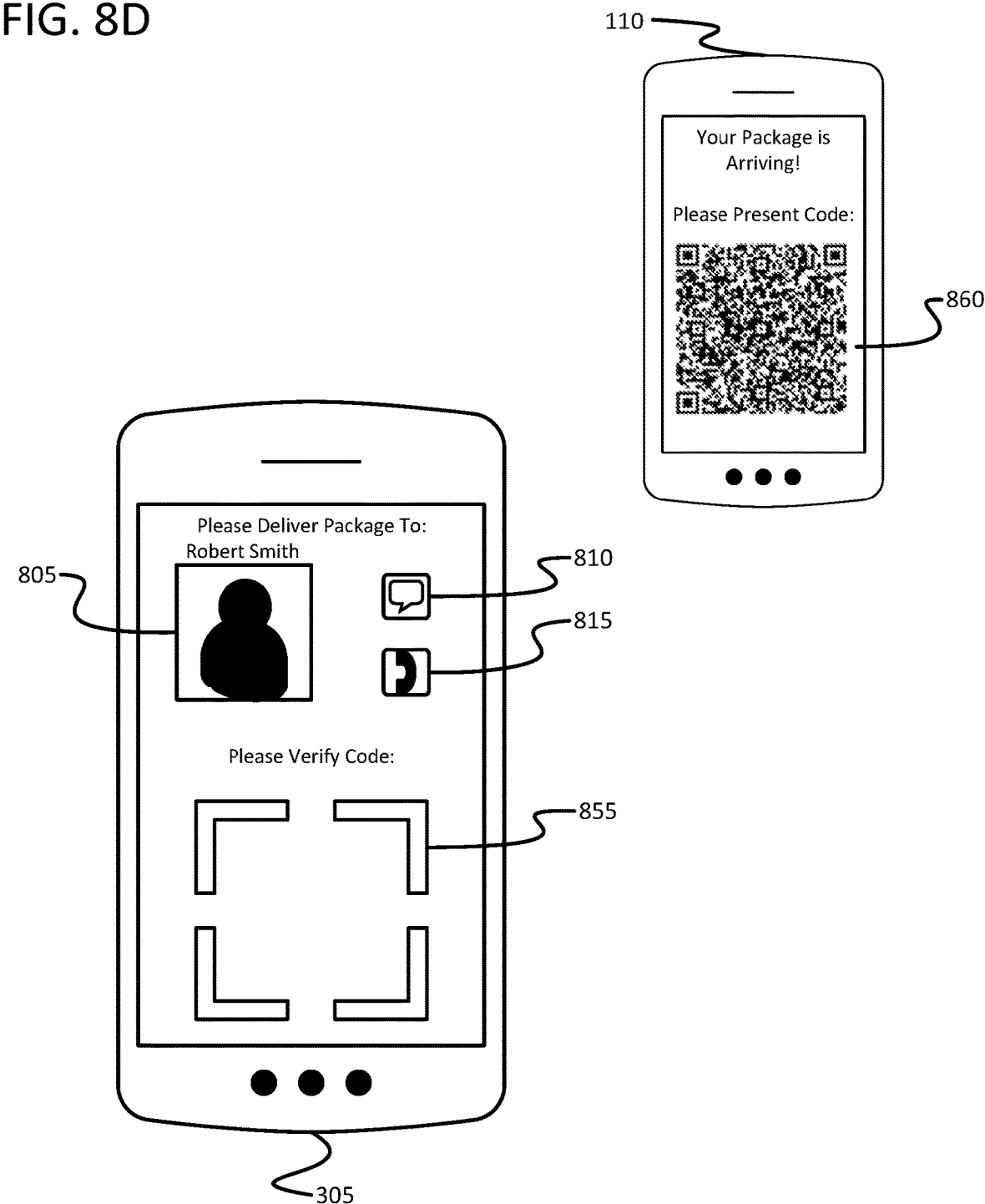

FIG. 8D shows an example of for first courier device 305 to validate a second code-based authentication component presented by first user device 110. In this regard, first user device 110 may display second code-based authentication component 860, and first courier device 305 may display image capture section 855. As described above, first courier device 305 may align second code-based authentication component 860 in image capture section 855 to validate second code-based authentication component 845. When validation is successful, the authentication process concludes, and the package may be released to first user 115. Turning to FIG. 8E, an example of a successful mutual authentication is shown. In this regard, first courier device 305 may display message 865 indicating that the authentication was successful and to release the package to the recipient. Similarly, first user device 110 may display message 870 indicating that the package has been delivered.

Figure 9:
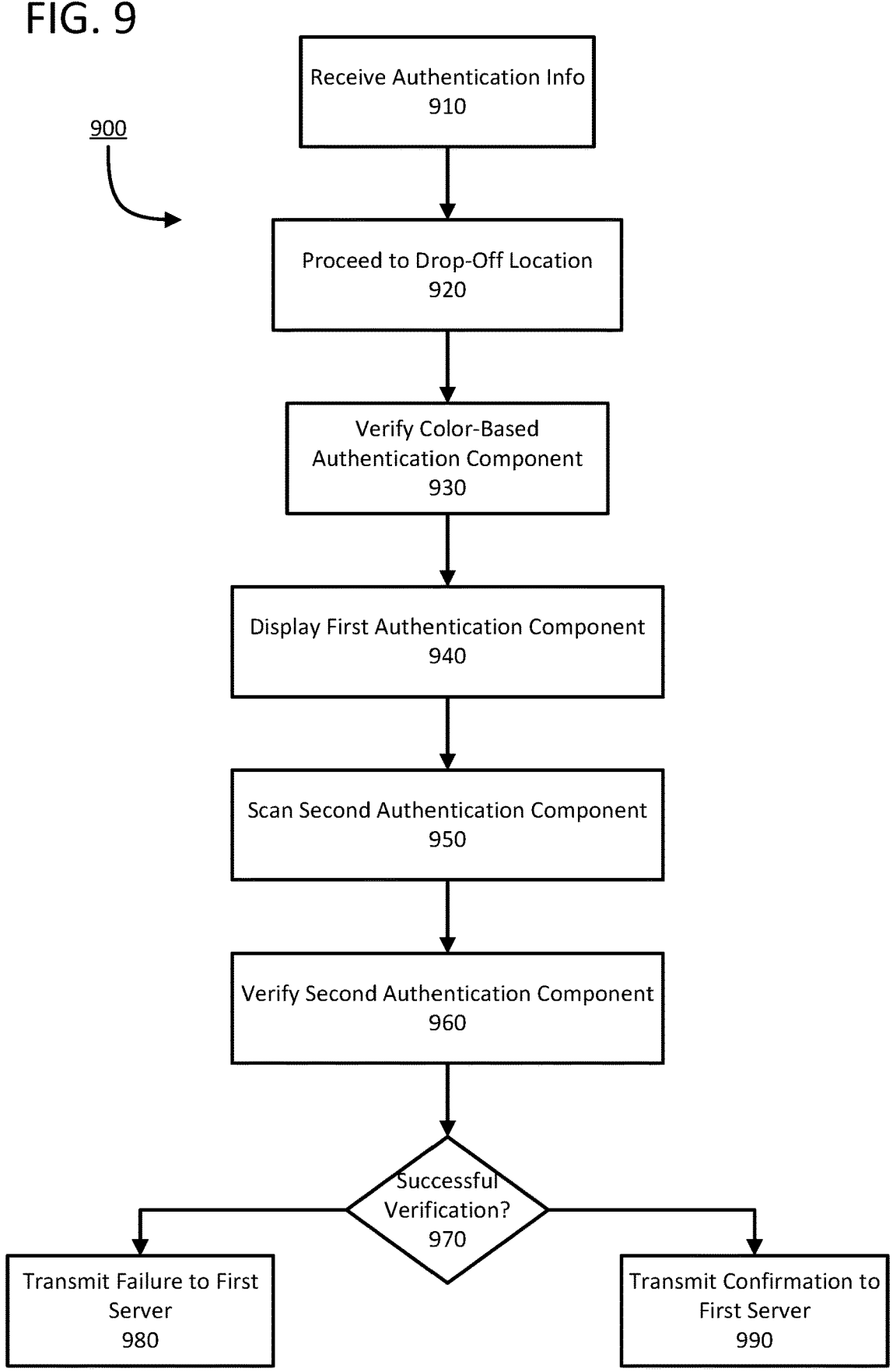
FIG. 9 shows a flow chart of a process for the authentication of a recipient device by a courier device according to one or more aspects of the disclosure.

Turning to FIG. 9, a flow chart of a process 900 for the mutual authentication performed by first courier device 305 is shown. Some or all of the steps of process 900 may be performed using one or more computing devices as described herein.

Process 900 begins in block 910, with first courier device 305 receiving authentication information from first server 120. As noted above, the authentication information may include at least a drop-off location, a color-based authentication component, and a code-based authentication component.

In block 920, the courier may proceed to the drop-off location. In some embodiments, the application may provide directions to the courier, via first courier device 305, from the courier's current location to the drop-off location. As noted above, the application may display the color-based authentication component which may change color as the courier approaches the processing facility. After arriving at the processing facility, the courier may use the color-based authentication component to locate the recipient in a crowd. In this regard, the recipient may use the corresponding color-based authentication component as a beacon for the courier to locate the recipient.

In block 930, first courier device 305 may verify color-based authentication component located on first user device 110. When the color-based authentication component is successfully authenticated, the mutual authentication process may proceed to authenticate the second factor (i.e., the code-based authentication component). In block 940, first courier device 305 may display a first code-based authentication component. First user device 110 may scan, or otherwise read, the first code-based authentication component. In response to the code-based authentication component being read, first courier device may receive a signal from first server 120 or, alternatively, first user device 100 that prompts first courier device 305 to scan a second code-based authentication component displayed on first user device 110 in block 950.

In block 960, first courier device may verify the second code-based authentication component. In block 970, first courier device 305 may determine whether the multifactor authentication was successful. When the multifactor authentication is unsuccessful, first courier device 305 may transmit an authentication failure to first server 120 in block 980. However, when the multifactor authentication is successful, first courier device 305 may transmit a confirmation to first server 120 in block 990. The confirmation may include an indication that the mutual authentication was performed successfully and that the package has been delivered.

Figure 10:
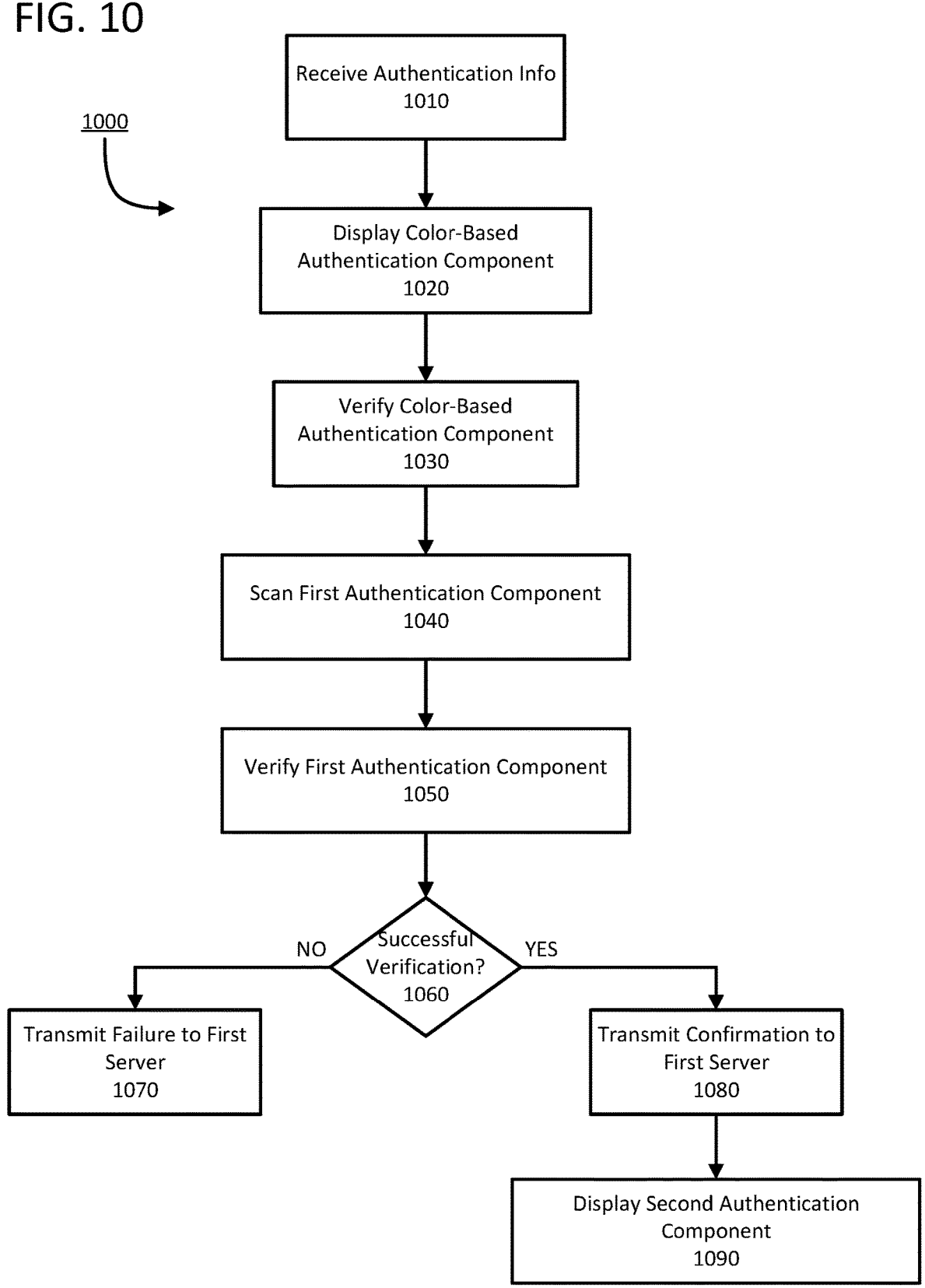
FIG. 10 shows a flow chart of a process for the authentication of a courier device by a recipient device according to one or more aspects of the disclosure.

Turning to FIG. 10, a flow chart of a process 1000 for the mutual authentication performed by first user device 110 is shown. Some or all of the steps of process 1000 may be performed using one or more computing devices as described herein.

In block 1010, first user device 110 may receive authentication information for the courier. In block 1020, first user device 110 may display the color-based authentication component. In block 1030, first user device may verify a color-based authentication component presented by first courier device 305. If the color-based authentication component presented by first courier device 305 does not match the color-based authentication component of the processing facility, the mutual authentication process concludes. However, when the color-based authentication components match, process 1000 continues in block 1040 with first user device 110 scanning a first code-based authentication component provided by first courier device 305. In block 1050, first user device 110 may verify the first code-based authentication component using the techniques described above. In block 1060, first user device 110 may determine whether the multifactor authentication of first courier device 305 was successful. When the multifactor authentication is unsuccessful, first user device 110 may transmit an authentication failure to first server 120 in block 1070. However, when the multifactor authentication is successful, first user device 110 may transmit a confirmation to first server 120 in block 1080. In block 1090, first user device 110 may display a second-code based authentication component for first courier device 305 to scan and authenticate first user device 110.

While the foregoing embodiments have been described in the context of a courier delivering a product on behalf of a bank, it will be appreciated that the processes and systems described herein may have applicability to other fields. For instance, the techniques herein may apply to the delivery of any good and the authentication techniques described herein could replace a signature as proof of delivery. For example, the techniques described herein may be used by a food delivery service to deliver an order to a user. The techniques described herein allow the order to be delivered to the user while the user is in a public location, such as a park or a concert. Similarly, the techniques described herein may be applied to the service of legal process. According to this example, a serving attorney may make the request that the process be served on a party. The process server may replace the courier in the examples described above, and the authentication techniques may be accepted as proof of service. These examples are merely illustrative, and it will be appreciated that the algorithms, techniques, systems, and methods disclosed herein may have broadly applicability to a number of areas and situations.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   receiving, by a first computing device, mutual authentication information from a first server, wherein the mutual authentication information includes a color-based authentication component;
   tracking a first location of the first computing device;
   providing navigation from the first location to a second location, wherein tracking the first location of the first computing device is part of the navigation;
   causing a first color from the color-based authentication component to be displayed on the first computing device, wherein the first color indicates that the first location is distant from the second location;
   determining, by the first computing device, that the first computing device is at the second location, wherein the second location is a destination of the first computing device;
   causing a second color from the color-based authentication component to be displayed on the first computing device based on the determination that the first computing device is at the second location;
   reading a third color presented by a second computing device, wherein the third color is read by an image capture device;
   comparing, by the first computing device, the third color to the second color to verify an identity of the second computing device;
   based on the third color matching the second color, causing a first machine-readable code to be displayed on the first computing device, wherein the first machine-readable code is at least one of a bar code or a QR code;
   reading a second machine-readable code presented by the second computing device, wherein the second machine-readable code is at least one of a bar code or a QR code;
   comparing the second machine-readable code to the first machine-readable code as part of a multifactor authentication of the second computing device;
   verifying the identity of the second computing device when the second machine-readable code matches the first machine-readable code.

2. The computer-implemented method of claim 1, wherein the first location of the first computing device is determined using one or more of GPS, location services, or an indoor location tracking service.

3. The computer-implemented method of claim 1, wherein the first color is determined based on a first time and the first location of the first computing device.

4. The computer-implemented method of claim 1, comprising:
   receiving the mutual authentication information from the first server based on an order submitted by the first computing device.

5. The computer-implemented method of claim 4, comprising:
   releasing the order to a second user when the identity of the second computing device has been verified.

6. The computer-implemented method of claim 1, wherein a first time is obtained from the first server.

7. The computer-implemented method of claim 1, wherein a color temperature of the first color changes to a warmer variant of the first color as the first computing device approaches the second location.

8. The computer-implemented method of claim 1, wherein a color temperature of the first color changes to a warmer variant of the first color based on time elapsing.

9. An apparatus comprising:
   one or more processors; and
      memory storing instructions that, when executed by the one or more processors, cause the apparatus to:
         receive authentication information, wherein the authentication information includes a color-based authentication component;
         determine a first location of the apparatus;
         cause a first color of the color-based authentication component to be displayed on the apparatus based on the first location, wherein the first color indicates that the first location is distant from a destination;
         determine a second location of the apparatus, wherein the second location is closer to the destination;
         cause a second color of the color-based authentication component to be displayed on the apparatus based on the second location, wherein the second color indicates that the second location is closer to the destination;
         determine a third location of the apparatus, wherein the third location is the destination;
         cause a third color from the color-based authentication component to be displayed on the apparatus based on the determination that the apparatus is at the third location;
         read a fourth color presented by a second computing device, wherein the fourth color is read by an image capture device;
         compare the fourth color to the third color to verify an identity of the second computing device;
         based on the fourth color matching the third color, cause a first machine-readable code to be displayed on the apparatus, wherein the machine readable code is one of a bar code or a QR code;
         scan a second machine-readable code displayed on a second computing device; and
         authenticate the second computing device as part of a multifactor authentication process when the second machine-readable code matches the first machine-readable code.

10. The apparatus of claim 9, wherein the first location of the apparatus is determined using one or more of GPS, location services, or an indoor location tracking service.

11. The apparatus of claim 9, wherein the instructions cause the apparatus to:
    provide navigation from the first location to the destination, wherein determining the first location, the second location, and the third location is part of the navigation.

12. The apparatus of claim 9, wherein the instructions cause the apparatus to:
    receive the authentication information from the first server based on an order submitted by the apparatus.

13. One or more non-transitory media storing instructions that, when executed by one or more processors, cause the one or more processors to perform steps comprising:

receiving authentication information from a first server, wherein the authentication information includes a color-based authentication component;

tracking a first location of a first computing device;

providing navigation from the first location to a second location, wherein tracking the first location of the first computing device is part of the navigation;

causing a first color from the color-based authentication component to be displayed on the first computing device, wherein the first color indicates that the first location is distant from the second location;

determining, by the first computing device, whether the first computing device is at a second location, wherein the second location is a destination of the first computing device;

causing a second color from the color-based authentication component to be displayed on the first computing device based on the determination that the first computing device is at the second location;

reading a third color presented by a second computing device, wherein the third color is read by an image capture device; and comparing, by the first computing device, the third color to the second color to determine if the third color matches the second color;

causing a first machine-readable code to be displayed on the first computing device in response to the third color matching the second color, wherein the first machine-readable code is at least one of a bar code or a QR code; and reading a second machine-readable code presented by the second computing device, wherein the second machine-readable code is at least one of a bar code or a QR code;

comparing the second machine-readable code to the first machine-readable code to verify an identity of the second computing device; and verifying the identity of the second computing device in response to the second machine-readable code matching the first machine-readable code.

14. The one or more non-transitory media of claim 13, wherein the first location of the first computing device is determined using one or more of GPS, location services, or an indoor location tracking service.

15. The one or more non-transitory media of claim 13, wherein the first color is determined based on a first time and the first location of the first computing device.

16. The one or more non-transitory media of claim 13, wherein the instructions, when executed, further cause the one or more processors to perform steps comprising:
receiving the mutual authentication information from the first server based on an order submitted by the first computing device.

17. The one or more non-transitory media of claim 16, wherein the instructions, when executed, further cause the one or more processors to perform steps comprising:
releasing the order when the identity of the second computing device has been verified.

18. The one or more non-transitory media of claim 13, wherein the instructions, when executed, further cause the one or more processors to perform steps comprising:
request a first time from the first server; and
receiving the first time from the first server in response to the request.

19. The one or more non-transitory media of claim 13, wherein a color temperature of the first color changes to a warmer variant of the first color as the first computing device approaches the second location.

20. The one or more non-transitory media of claim 13, wherein a color temperature of the first color changes to a warmer variant of the first color based on time elapsing.

* * * * *